(12) United States Patent
Funabashi et al.

(10) Patent No.: US 8,988,019 B2
(45) Date of Patent: Mar. 24, 2015

(54) ELECTRIC OPERATING MACHINE

(75) Inventors: Kazuhiko Funabashi, Hitachinaka (JP); Nobuhiro Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 20 days.

(21) Appl. No.: 13/496,601

(22) PCT Filed: Jan. 14, 2011

(86) PCT No.: PCT/JP2011/000186
§ 371 (c)(1),
(2), (4) Date: Jun. 4, 2012

(87) PCT Pub. No.: WO2011/086946
PCT Pub. Date: Jul. 21, 2011

(65) Prior Publication Data
US 2012/0274244 A1    Nov. 1, 2012

(30) Foreign Application Priority Data

Jan. 14, 2010  (JP) ................................. 2010-006326

(51) Int. Cl.
*H02P 7/28* (2006.01)
*H02P 7/29* (2006.01)
*A01D 34/78* (2006.01)
*A01D 34/90* (2006.01)
(Continued)

(52) U.S. Cl.
CPC .............. *H02P 29/022* (2013.01); *A01D 34/78* (2013.01); *A01D 34/90* (2013.01); *B25F 5/00* (2013.01); *H02J 7/0063* (2013.01); *H02J 2007/0067* (2013.01)
USPC ...... 318/139; 318/400.26; 318/466; 318/490; 173/217; 320/134; 320/163

(58) Field of Classification Search
USPC ............ 318/139, 432, 434, 466, 490, 400.26; 388/811; 320/114, 119, 134, 163; 56/11.9; 173/217
See application file for complete search history.

(56) References Cited

U.S. PATENT DOCUMENTS 4,873,453 A    10/1989  Schmerda et al.
5,440,215 A *   8/1995  Gilmore ........................ 318/432
(Continued)

FOREIGN PATENT DOCUMENTS

CN    2048256 U    11/1989
CN    1665098 A    9/2005
(Continued)

OTHER PUBLICATIONS

Chinese Office Action issued in Chinese Application No. 201180006048.8 issued Apr. 3, 2014, with English Translation.
(Continued)

*Primary Examiner* — Paul Ip
(74) *Attorney, Agent, or Firm* — McDermott Will & Emery LLP

(57) ABSTRACT

An electric operating machine comprising a motor and a power circuit driving the motor by the electric power supplied from a battery. The power circuit comprises a voltage conversion part converting an input voltage entered in accordance with a voltage of said battery to generate an output voltage and outputting said generated output voltage to said motor. The power circuit is structured so that the voltage value of said output voltage of said voltage conversion part is changeable.

5 Claims, 12 Drawing Sheets

(51) Int. Cl.
*B25F 5/00* (2006.01)
*H02J 7/00* (2006.01)
*H02P 29/02* (2006.01)

(56) References Cited

U.S. PATENT DOCUMENTS

| | | | |
|---|---|---|---|
| 5,731,673 A * | 3/1998 | Gilmore | 318/432 |
| 5,937,622 A * | 8/1999 | Carrier et al. | 56/11.9 |
| 6,170,241 B1 * | 1/2001 | Shibilski et al. | 56/11.9 |
| 6,388,426 B1 * | 5/2002 | Yokoo et al. | 320/136 |
| 6,424,799 B1 * | 7/2002 | Gilmore | 388/811 |
| 6,836,614 B2 * | 12/2004 | Gilmore | 388/811 |
| 7,042,180 B2 | 5/2006 | Terry et al. | |
| 7,112,934 B2 * | 9/2006 | Gilmore | 318/432 |
| 7,135,791 B2 | 11/2006 | Kushida et al. | |
| 7,183,740 B2 | 2/2007 | Nakayama et al. | |
| 7,292,009 B2 * | 11/2007 | Kawakami et al. | 322/29 |
| 7,541,773 B2 | 6/2009 | Funabashi et al. | |
| 7,574,873 B2 | 8/2009 | Goto et al. | |
| 7,688,028 B2 * | 3/2010 | Phillips et al. | 320/114 |
| 7,697,826 B2 | 4/2010 | Reutlinger et al. | |
| 7,728,553 B2 * | 6/2010 | Carrier et al. | 320/119 |
| 8,044,633 B2 | 10/2011 | Tatematsu et al. | |
| 2003/0096158 A1 * | 5/2003 | Takano et al. | 429/90 |
| 2003/0173940 A1 | 9/2003 | Kovarik et al. | |
| 2005/0057226 A1 * | 3/2005 | Kawakami et al. | 322/24 |
| 2005/0073282 A1 * | 4/2005 | Carrier et al. | 320/106 |
| 2006/0071643 A1 * | 4/2006 | Carrier et al. | 320/132 |
| 2006/0087283 A1 * | 4/2006 | Phillips et al. | 320/114 |
| 2006/0087286 A1 * | 4/2006 | Phillips et al. | 320/114 |
| 2006/0113934 A1 * | 6/2006 | Kushida et al. | 318/139 |
| 2006/0214642 A1 * | 9/2006 | Miyazaki et al. | 320/150 |
| 2006/0220605 A1 * | 10/2006 | Funabashi et al. | 318/434 |
| 2007/0126407 A1 * | 6/2007 | Loong | 323/210 |
| 2007/0247097 A1 | 10/2007 | Seiler et al. | |
| 2008/0238370 A1 * | 10/2008 | Carrier et al. | 320/134 |
| 2008/0251268 A1 | 10/2008 | Kushida | |
| 2008/0297080 A1 | 12/2008 | Bosch | |
| 2009/0160373 A1 | 6/2009 | Katou et al. | |
| 2009/0295313 A1 * | 12/2009 | Suzuki et al. | 318/139 |
| 2010/0084150 A1 * | 4/2010 | Suzuki et al. | 173/2 |
| 2010/0085010 A1 * | 4/2010 | Suzuki et al. | 320/132 |
| 2010/0141207 A1 * | 6/2010 | Phillips et al. | 320/114 |
| 2010/0213900 A1 * | 8/2010 | Carrier et al. | 320/134 |
| 2012/0091929 A1 * | 4/2012 | Kusakawa | 318/139 |
| 2012/0234573 A1 * | 9/2012 | Suda et al. | 173/217 |

FOREIGN PATENT DOCUMENTS

| | | |
|---|---|---|
| CN | 1742427 A | 3/2006 |
| CN | 1757155 A | 4/2006 |
| CN | 100361384 C | 1/2008 |
| CN | 101447757 A | 6/2009 |
| CN | 101632221 A | 1/2010 |
| EP | 1 571 458 A1 | 9/2005 |
| EP | 2 120 310 A1 | 11/2009 |
| JP | 61-262060 A | 11/1986 |
| JP | 2006-217843 | 8/2006 |
| JP | 2008-228534 A | 9/2008 |
| WO | WO 2009/102082 A2 | 8/2009 |
| WO | WO 2011/024479 A2 | 3/2011 |

OTHER PUBLICATIONS

Chinese Office Action issued in Chinese Application No. 201180006051.X dated Oct. 8, 2014, w/English translation.

Notice of Allowance issued in U.S. Appl. No. 13/496,602 mailed Jun. 25, 2014.

Office Action issued in U.S. Appl. No. 13/496,602 dated Feb. 10, 2014.Office Action issued in Chinese Patent Application No. 201180006051.X dated Jan. 30, 2014.

Office Action issued in U.S. Appl. No. 13/496,602 dated Feb. 10, 2014.

Notification of Second Office Action Chinese Patent Application No. 201180006048 dated Dec. 15, 2014 with full English translation.

* cited by examiner

ELECTRIC OPERATING MACHINE

TECHNICAL FIELD

The present invention relates to an electric operating machine.

BACKGROUND ART

The above electric machine, for example, includes an electric operating machine having a driven object (such as a rotary blade) driven by a motor (for example, an electric mowing machine). As such an electric mowing machine, Patent Literature 1 discloses an electric mowing machine having adjustable motor rotation speed. This electric mowing machine has a converter to change the voltage applied to the motor so as to change the motor rotation speed.

CITATION LIST

Patent Literature

PTL 1: Unexamined Japanese Patent Application KOKAI publication No. 2006-217843

SUMMARY OF INVENTION

Technical Problem

However, the Patent Literature 1 discloses no technique for protecting the power circuit itself of the electric operating machine; the power circuit itself is not sufficiently protected.

Solution to Problem

The present invention is invented in view of the above problem and an exemplary purpose of the present invention is to provide an electric operating machine having the power circuit properly protected.

In order to achieve the above purpose, the electric operating machine according to an exemplary aspect of the present invention is an electric operating machine comprising a motor and a power circuit driving the motor by the electric power supplied from a battery, wherein:

the power circuit comprises a voltage conversion part converting an input voltage entered in accordance with a voltage of the battery to generate an output voltage and outputting the generated output voltage to said motor, and the power circuit is structured so that the voltage value of the output voltage of the voltage conversion part is changeable.

Possibly, the power circuit further comprises a voltage detection part outputting a first signal in accordance with the voltage of the battery, and the voltage conversion part lowers the voltage value of new output voltage being generated when the voltage detection part outputs the first signal.

Possibly, the voltage detection part outputs the first signal when the voltage value of the output voltage of the battery does not satisfy a given criterion.

Possibly, the voltage conversion part lowers the voltage value of the output voltage when the first signal is supplied.

Possibly, the power circuit further comprises a voltage control part outputting to the voltage conversion part a second signal of a voltage value in accordance with the output voltage output from the voltage conversion part, and the voltage conversion part generates new output voltage having a voltage value in accordance with the second signal output from the voltage control part when the voltage detection part does not output the first signal.

Advantageous Effects of Invention

The present invention can provides an electric operating machine having the power circuit properly protected.

DESCRIPTION OF EMBODIMENTS

The electric operating machine according to embodiments of the present invention is described hereafter with reference to the drawings. For easier understanding of the present invention, unimportant known technical matters are not explained in the following explanation as appropriate. The electric operating machine according to embodiments is an electric mowing machine having a rotary blade driven by a motor.

(Embodiment 1)

Figure 1:
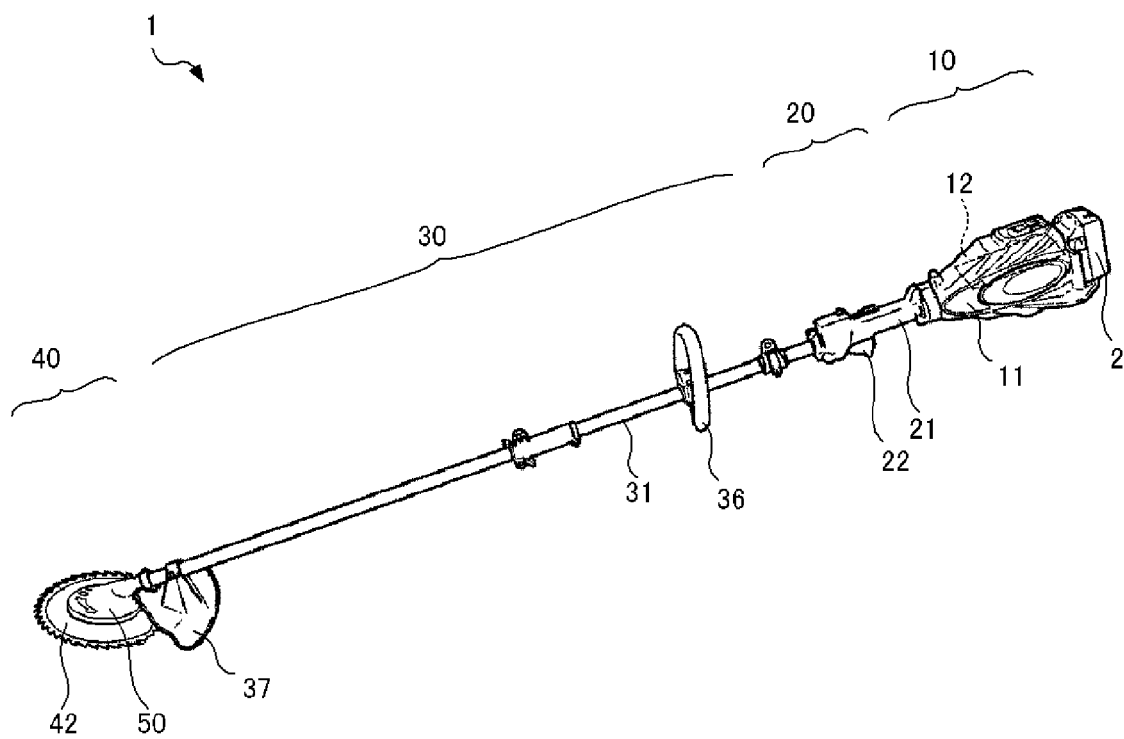
FIG. 1 is an illustration showing the appearance of the electric operating machine according to Embodiment 1 of the present invention.

Embodiment 1 of the present invention will be described hereafter with reference to FIGS. 1 to 7, 11 and 12. As shown in FIG. 1, an electric operating machine 1 according to Embodiment 1 comprises a power source part 10, an operation part 20, a coupling part 30, and a drive part 40.

The power source part 10 comprises a power source housing 11 and a power circuit 12. Furthermore, a battery 2 is attached to the power source part 10.

The power source housing 11 constitutes the enclosure of the power source part 10 and houses the power circuit 12.

The battery 2 is mounted on a battery holder provided to the power source housing 11 and electrically connected to the power circuit 12. The battery 2 serves as the power source for supplying electric power to the power circuit 12.

The power circuit 12 converts the output voltage of the battery 2 to a voltage having a given magnitude and outputs the converted voltage to a motor 50 of the drive part 40, which will be described later. The power circuit 12 will be described in detail later. The power circuit 12 drives the motor 50 by the electric power supplied from the battery.

The operation part 20 comprises a handle 21 and a trigger lever 22.

The handle 21 is fixed to the power source housing 11 of the power source part 10 and to one end of the coupling part 30.

The trigger lever 22 is connected to a switch 113 of the power circuit 12 of the power source part 10, which will be described later, and is operated by the user to turn on/off the switch 113. Therefore, the trigger lever 22 drives/stops the motor 50.

The coupling part 30 comprises a hollow duct 31 made of an aluminum alloy, reinforced plastic or the like. The coupling part 30 couples the operation part 20 and drive part 40. A power cable extends from the power circuit 12 of the power source part 10 to the motor 50 of the drive part 40 through the hollow duct 31 of the coupling part 30. The power cable electrically connects the drive part 40 and power circuit 12 for supplying electric power from the power circuit 12 to the motor 50.

The coupling part 30 further comprises an additional handle 36. The user can hold the additional handle 36 and handle 21 to operate the electric operating machine 1. The coupling part 30 further comprises a protective cover 37 covering a part of a rotary blade 42 of the drive part 40 so that the user does not touch the rotary blade 42 while it is in use.

The drive part 40 comprises a motor 50 and a rotary blade 42 (working tool). Supplied with electric power from the power circuit 12 of the power source part 10, the motor 50 rotates the rotary blade 42.

The motor 50 will be described in detail hereafter with reference to FIG. 2.

The motor 50 is a commutator motor including a motor housing 51, an output shaft 52, a rotor 53, a stator 54, and sliders 55.

The motor housing 51 is fixed to the other end of the coupling part 30. The motor housing 51 has an exhaust outlet 56. On the other hand, the coupling part 30 has an air inlet 38 communicated with the inside of the motor housing 51.

The output shaft 52 is rotatably supported by bearings 57 and 58 provided in the motor housing 51. The output shaft 52 protrudes from the motor housing 51 at one end, to which the rotary blade 42 is fixed.

The rotor 53 is housed in the motor housing 51 and provided integrally with the output shaft 52. The rotor 53 includes a flange 61, a coil/commutator disc 62, four coil discs 63, a rotor yoke 67, and a fan 68.

The flange 61 is made of an aluminum alloy and includes a cylindrical fixture 611 and a support member 612 in the form of a disc extending from the outer periphery of the fixture 611 in the direction nearly perpendicular thereto. With the fixture 611 being fitted on the output shaft 52 and inhibited from rotating, the flange 61 rotates together with the output shaft 52.

The coil/commutator disc 62 and coil discs 63 are each in the shape of a disc with a center fitting hole. They are each a printed wiring board having an insulating substrate and a conductor pattern on the insulating substrate. One coil/commutator disc 62 and four coil discs 63 are layered so that the coil/commutator disc 62 is the topmost layer.

The coil/commutator disc 62 has an annular commutator region 80 on the top surface. A conductor pattern forms a commutator 81 in the commutator region 80. The commutator 81 consists of multiple commutator segments arranged in the circumferential direction. A through-hole 83 running through the coil/commutator disc 62 is formed at the outer end of each commutator segment 82.

The coil/commutator disc 62 and coil discs 63 each have, on their top surfaces, an annular coil region 90 situated outside the commutator region 80. Nearly the same conductor pattern forms multiple coil segments 92 arranged in the circumferential direction around the output axis 52 in each coil region 90. Multiple coil segments 92 are arranged radially about the output axis 52. The coil segments 92 formed in each coil region 90 generate a vertical magnetic field. The coil segments 92 constitute one or more coils. The coil/commutator disc 62 and coil discs 63 are layered in a given arrangement, for example, in the manner that the coil segments 92 formed in each coil region 90 are provided at equal intervals in the circumferential direction.

One end and the other end of the coil segments 92 formed in the coil region 90 of the coil/commutator disc 62 are directly connected to the corresponding commutator segment 82 formed in the commutator region 80 by a conductor pattern. Furthermore, one end and the other end of the each coil segment formed in the coil regions 90 of the coil discs 63 are connected to the corresponding commutator segment 82 formed in the commutator region 80 via fitting holes or vias formed in the commutator region 80. The outer end of each coil segment 92 is bent in a given direction about the output axis 52. Multiple through-holes 93 running through the coil/commutator disc 62 are formed at the outer end of each coil segment 92.

The conductor patterns in the commutator region 80 and coil region 90 of the coil/commutator disc 62 are formed on the same printed wiring. Furthermore, the conductive patterns on the coil/commutator disc 62 are thicker than the conductor pattern on the coil discs 63.

The coil/commutator disc 62 and coil discs 63 have nearly the same inner diameter and outer diameter. Fitted on the fixture 611 of the flange 61 and supported by the top surface of the support member 612 of the flange 61, the coil/commutator disc 62 and coil discs 63 are fixed to the flange 61.

The rotor yoke 67 is an annular iron sheet member and secured to the top surface of the coil/commutator disc 62 via a not-shown insulating layer. The rotor yoke 67 has nearly the same outer diameter as the coil/commutator disc 62 and coil discs 63 and an inner diameter to cover the coil region 90.

Figure 4:
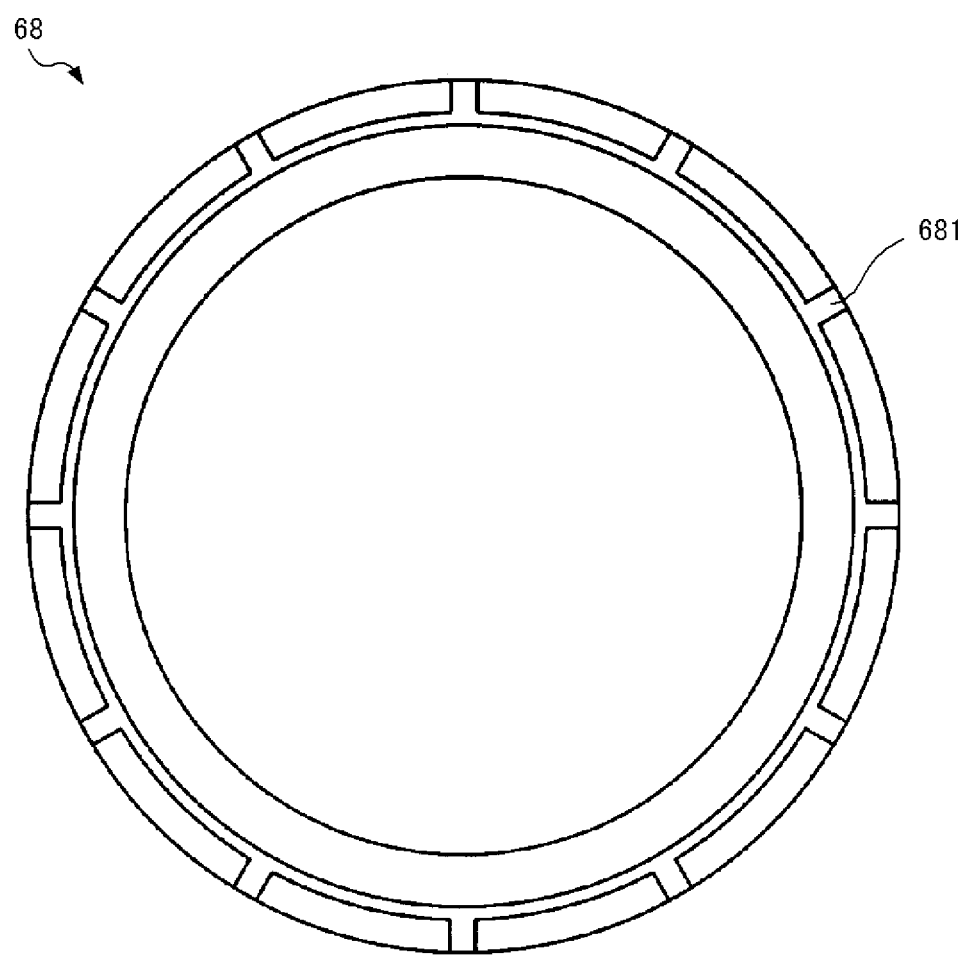
FIG. 4 is a bottom view showing the fan of the rotor shown in FIG. 3.

The fan 68 is an annular synthetic resin member, fitted on the outer peripheries of the rotor yoke 67, coil/commutator disc 62, and coil discs 63, and secured to the top surface of the rotor yoke 67 via a not-shown adhesive layer. The fan 68 has multiple blades 681 protruding in the direction of the outer diameter. The multiple blades 681 are arranged at nearly equal intervals in the circumferential direction as shown in FIG. 4.

Figure 2:
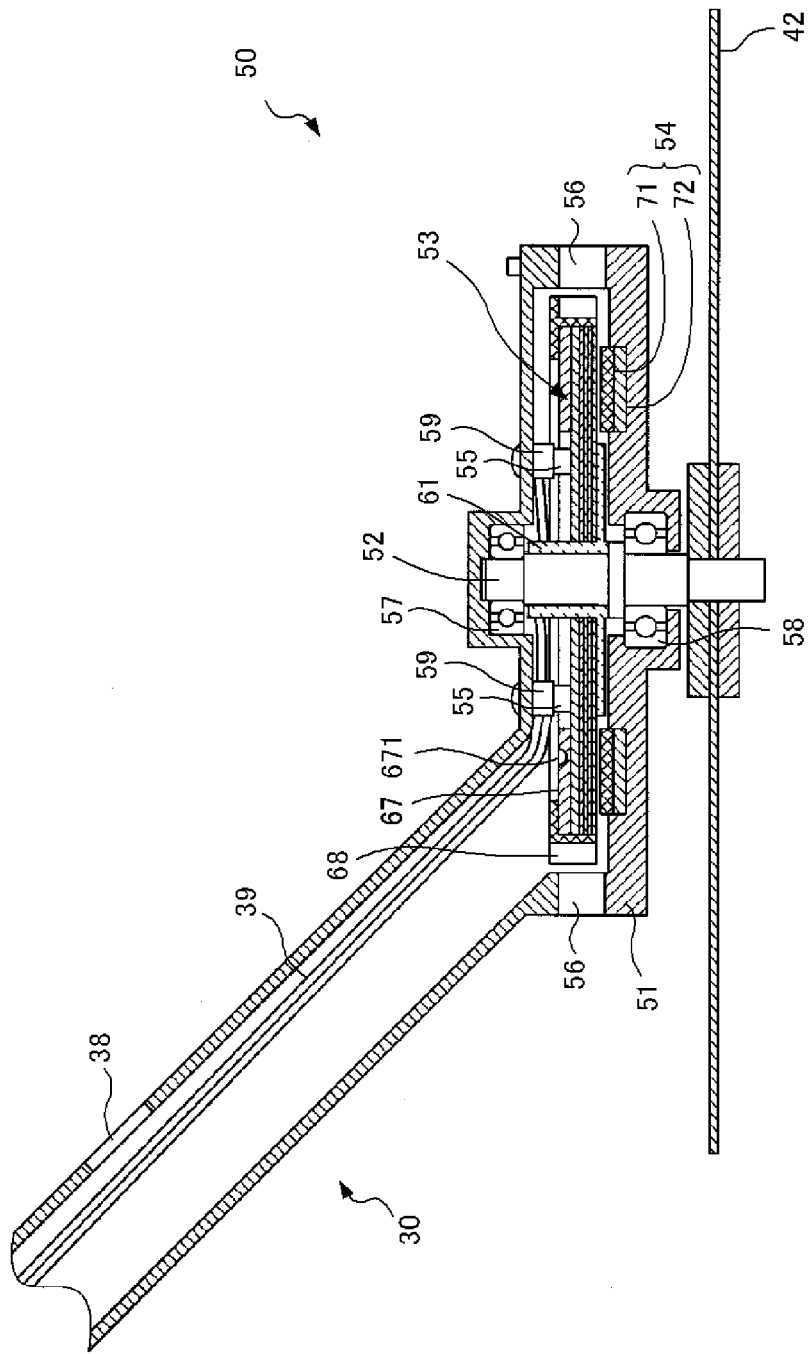
FIG. 2 is a cross-sectional view showing the motor of the electric operating machine shown in FIG. 1.
Figure 3:
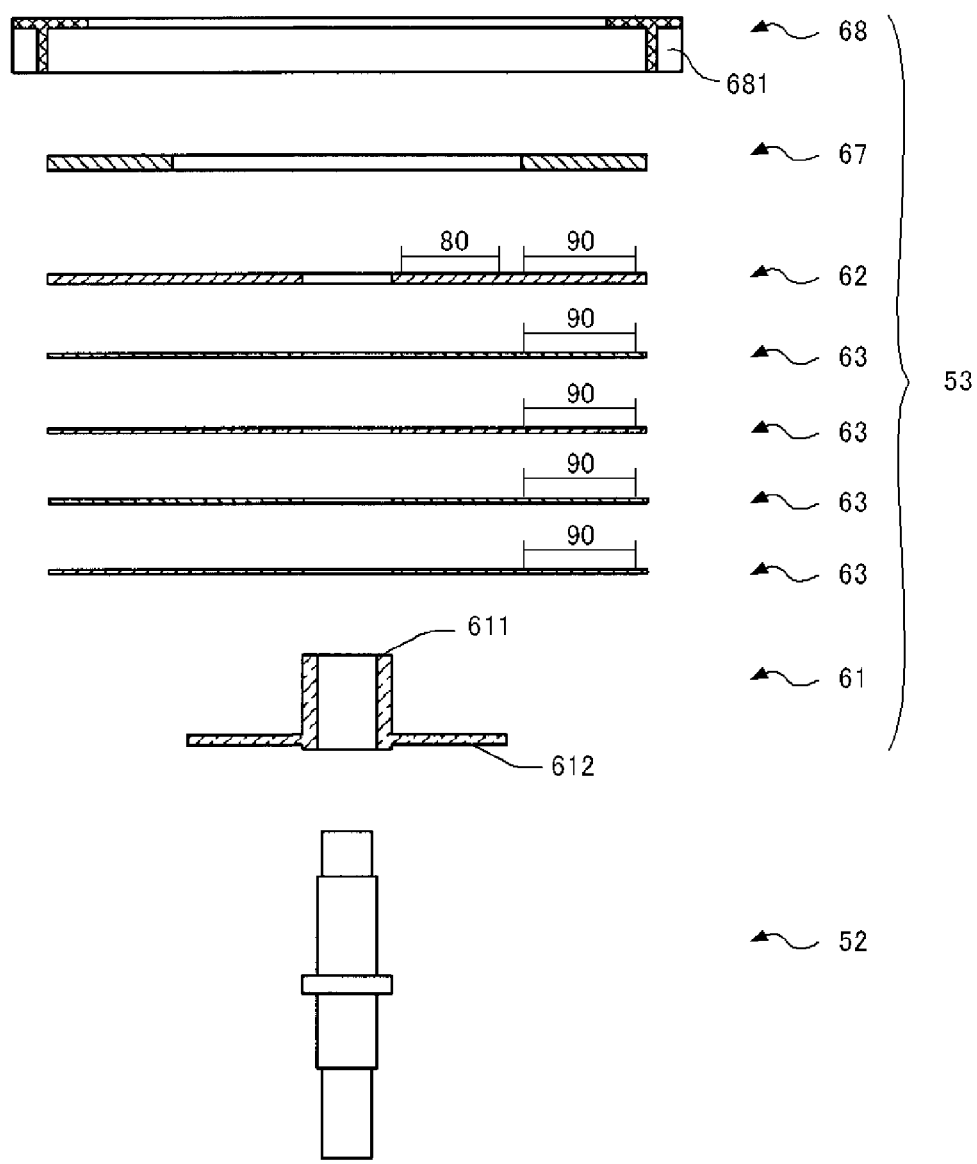
FIG. 3 is an exploded cross-sectional view showing the output shaft and rotor of the motor shown in FIG. 2.

In order to correct any imbalance of the rotor 53 (unbalanced weight with respect to the rotation axis), a hole 671 is made in the top surface of the rotor yoke 67 as shown in FIG. 2. Here, a weight can be added to the top surface of the rotor yoke 67 in order to correct any imbalance of the rotor 53.

The stator 54 includes a magnet 71 and a stator yoke 72. The magnet 71 has an annular shape with magnet poles arranged in the circumferential direction. The magnet 71 faces the bottommost coil disc 63 and faces the coil regions 90 of the coil/commutator disc 62 and coil discs 63, and is secured to the stator yoke 72. The stator yoke 72 has an annular shape having nearly the same inner diameter and outer diameter as the magnet 71 and is fixed to the motor housing 51. The magnet 71 generates a magnetic flax passing in the axial direction of the output shaft through the coil/commuter disc 62 and the coil disc 63.

Abutting against two commutator segments 82 formed in the commutator region 80 of the coil/commutator disc 62, two sliders 55 are held on two slider holders 59 fixed to the motor housing 51. The sliders 55 are made of electrically conductive carbon and connected to the power circuit 12 of the above-described power source part 10 via the power cable 39 inserted in the coupling part 30.

The voltage applied to the sliders 55 from the power circuit 12 of the power source part 10 is applied to the one or more coils of the rotor 53 in sequence via the commutator of the rotor 53. Then, the attraction between the excited one or more coils and the magnet 71 of the stator 54 generates torque on the rotor 53 and the output shaft 52 fixed to the rotor 53, rotating the rotary blade 42.

Figure 5:
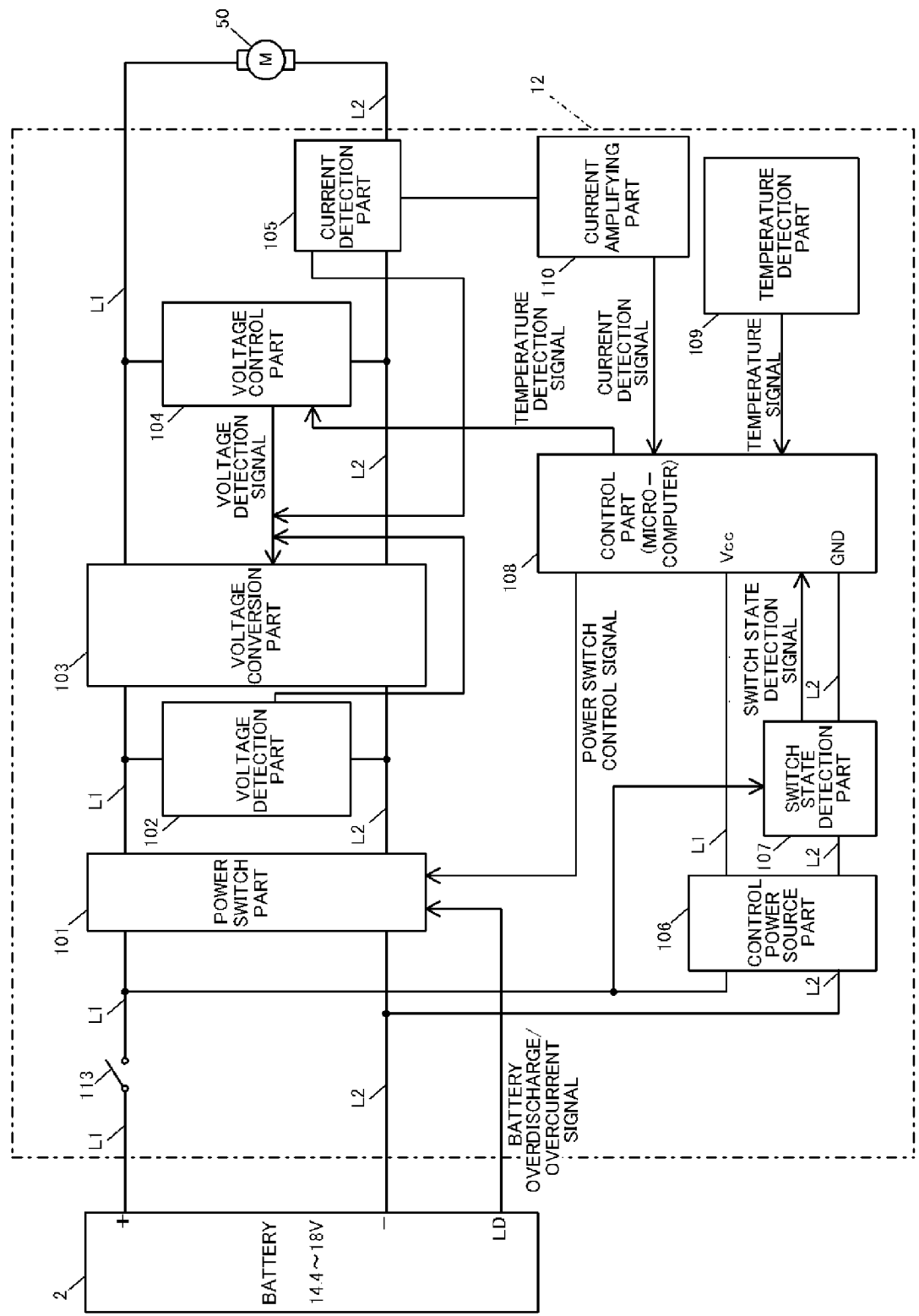
FIG. 5 is a block diagram for explaining the configuration of the power circuit of the electric operating machine according to Embodiment 1 of the present invention.
Figure 6:
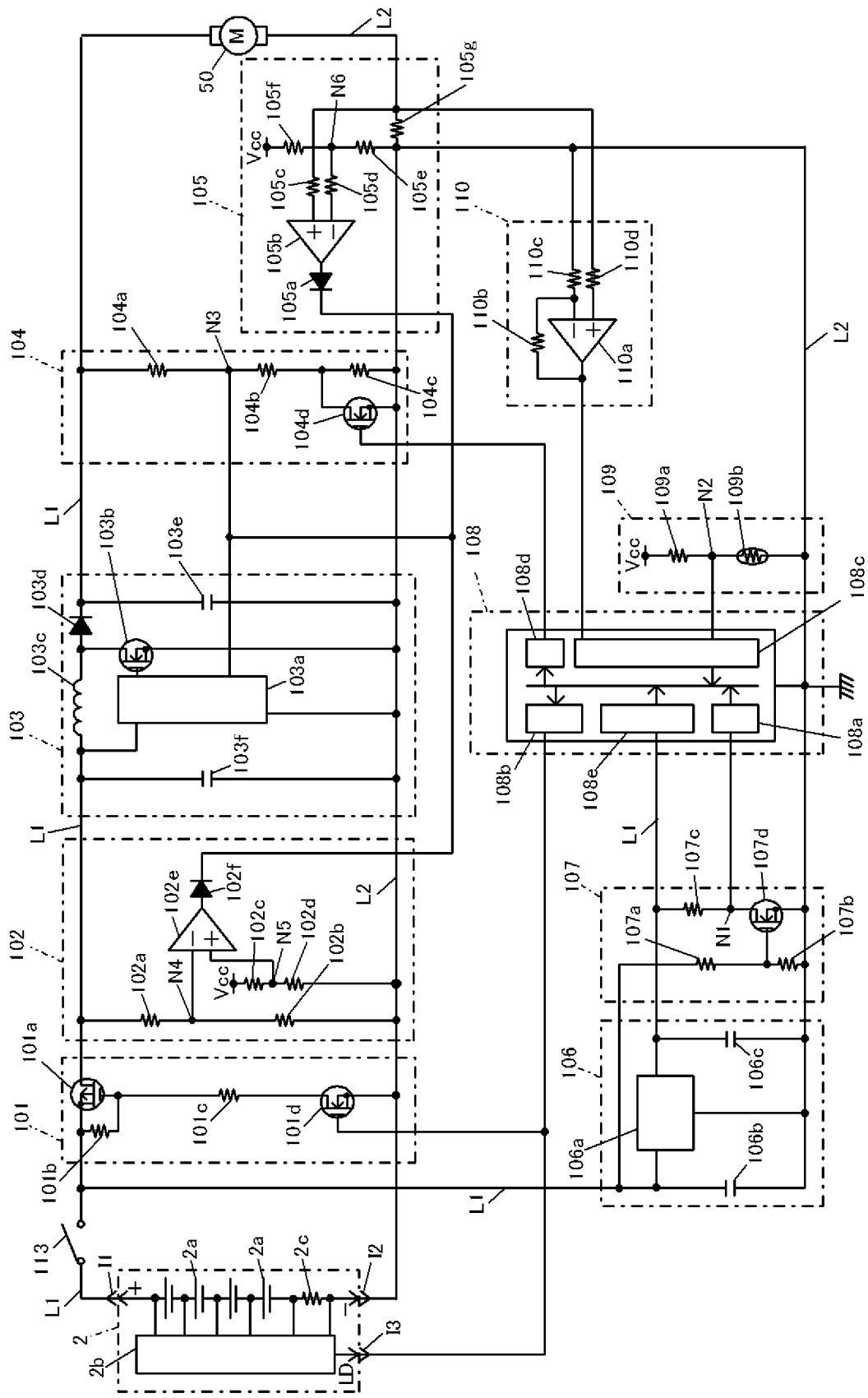
FIG. 6 is a circuit diagram for explaining an exemplary power circuit of the electric operating machine according to Embodiment 1 of the present invention.

The power circuit 12 will be described hereafter with reference to FIGS. 5 and 6. In the following explanation, the term 'connection' means 'electric connection', 'high signals' are signals having a voltage value higher than a given threshold, and 'low signals' are signals having a voltage value lower than the given threshold. The thresholds for high signals (low signals) can be all the same or different. For example, threshold for power switch control signals, threshold for voltage lowering signals, and the like may be the same or different.

The power circuit 12 comprises a power switch part 101, a voltage detection part 102, a voltage conversion part 103, a voltage control part 104, a current detection part 105, a control power source part 106, a switch state detection part 107, a control part 108, a temperature detection part 109, a current amplifying part 110, and a switch 113. The power circuit 12 further comprises input terminals I1, I2, and I3.

The battery 2 may be a power source supplying a given direct current power. Here, the battery 2 is a battery pack. The battery 2 comprises multiple unit cells 2a, a protection circuit 2b, an overcurrent detection resistor 2c, a positive terminal (+), a negative terminal (−), and a control signal output terminal (LD).

The multiple unit cells 2a are series-connected. Here, the unit cells 2a are lithium ion batteries. The positive end of the series-connected multiple unit cells 2a is connected to the positive terminal (+). The negative end thereof is connected to one end of the overcurrent detection resistor 2c. The other end of the overcurrent detection resistor 2c is connected to the negative terminal (−). The overcurrent detection resistor 2c is used to detect the current from the unit cells 2a (the battery 2) (flowing through the battery 2).

The protection circuit 2b is connected to the unit cells 2a and overcurrent detection resistor 2c to detect the voltage of the unit cells 2a and detect the current from the unit cells 2a by means of the overcurrent detection resistor 2c. The protection circuit 2b is also connected to the control signal output terminal (LD). The protection circuit 2b determines whether, for example, the detected voltage of the unit cells 2a or the detected current from the unit cells 2a is abnormal and, if abnormal, outputs control signals (battery overdischarge/overcurrent signals) to the outside of the battery 2 via the control signal output terminal (LD). Here, the control signals are low signals output when at least one of overdischarge and overcurrent occurs. For example, the protection circuit 2b short-circuits between the control signal output terminal (LD) and negative terminal (−) to generate and output such signals.

As the battery 2 is attached to the power source part 10, the positive terminal (+) is connected to the input terminal I1 and the negative terminal (−) is connected to the input terminal I2. Then, the battery 2 is ready for supplying electric power to the power circuit 12. Furthermore, the control signal output terminal (LD) is connected to the input terminal I3. The input terminal I3 is connected to the power switch part 101. The battery overdischarge/overcurrent signals are supplied to the power switch part 101.

Each element of the power circuit 12 is, connected, as appropriate, to a line, such as, a positive terminal line L1 or a negative terminal line L2 of the power circuit 12, or provided at a point on one of these lines. The positive terminal line L1 is a line to connect to the positive terminal (+) of the battery 2 via the input terminal I1. The negative terminal line L2 is a line to connect to the negative terminal (−) of the battery 2 via the input terminal I2. The battery 2 and motor 50 are connected to the positive terminal and negative terminal lines L1 and L2, whereby electric power is supplied from the battery 2 to the motor 50.

The switch 113 is provided at a point on the positive terminal line L1 between the input terminal I1 and power switch part 101. The switch 113 is turned on when the trigger lever 22 is pulled and turned off when the trigger lever 22 is returned to the original state. When the switch 113 is turned on, electric power is supplied to the power circuit 12 from the battery 2.

When the switch 113 is turned on, electric power is supplied to the control power source part 106 from the battery 2. The control power source part 106 serves as a constant voltage power source circuit outputting a given constant voltage Vcc (here, 5 V) to given elements of the power circuit 12 (such as the control part 108, power switch part 101, and current detection part 105) by the electric power supplied from the battery 2. Here, the constant voltage Vcc is also applied to elements such as a comparator 105b. The lines for applying the constant voltage Vcc to the power switch part 101, current detection part 105, and the like (control power source lines) have a known structure and they are omitted in FIGS. 5 and 6 as appropriate. The elements to which the constant voltage Vcc is applied operate as they receive the constant voltage Vcc.

The control power source part 106 comprises a control power circuit 106a and capacitors 106b and 106c.

The control power circuit 106a is provided at a point on the positive terminal line L1 and connected to the negative terminal line L2. The control power circuit 106a is further connected to the control part 108 (power source part 108e). An output voltage, namely the voltage output from the battery 2 is applied to the control power circuit 106a when the switch 113 is turned on. The control power circuit 106a converts this voltage to the above constant voltage Vcc and outputs it to given elements of the power circuit 12 (see the above) including the control part 108 (power source part 108e).

The capacitors 106b and 106c are each connected to the control power circuit 106a at one end and to the negative terminal line L2 at the other end. The capacitors 106b and 106c are used to smooth the above voltage applied to the control power circuit 106a and the constant voltage Vcc output from the control power circuit 106a, respectively.

The switch state detection part 107 detects the ON state of the switch 113. When the switch 113 is ON, electric power is supplied from the battery 2. Based on this electric power supply, the switch state detection part 107 outputs control signals (switch state detection signals) in accordance with the ON state of the switch 113 to the control part 108. In this way, the switch state detection part 107 detects the ON state of the switch 113.

The switch state detection part 107 comprises resistors 107a, 107b, and 107c and a FET (field effect transistor) 107d.

The resistor 107a is connected to the positive terminal line L1 at one end and to the resistor 107b and gate of the FET 107d at the other end. The resistor 107b is connected to the resistor 107a and gate electrode of the FET 107d at one end and to the negative terminal line L2 at the other end. The resistor 107c is connected to the positive terminal line L1 at one end and to the drain of the FET 107d via a node N1 at the other end. The resistor 107c and FET 107d are series-connected. The source of the FET 107d is connected to the negative terminal line L2. Here, the FET 107d is an n-channel type power MOSFET (power insulated gate field effect transistor). The node N1 is connected to the control part 108.

When the switch 113 is turned on, the constant voltage Vcc is applied to the series-connected resistors 107c and FET 107d. On the other hand, when the switch 113 is turned on, electric power is supplied from the battery 2 and a given voltage is applied to the series-connected resistors 107a and 107b. This voltage is divided between the resistors 107a and 107b. A divided voltage is applied between the source and gate of the FET 107d. Then, the FET 107d is turned on and a current flows between the source and drain. Consequently, of the series-connected resistors 107c and FET 107d, the potential difference between the source and drain is diminished and low signals which are control signals (switch state detection signals) are output from the node N1 to the control part 108 (input port 108a).

The temperature detection part 109 is a part for measuring the temperature of a given site of the electric operation machine 1. The temperature detection part 109 outputs electric signals (temperature signals) in accordance with the temperature of the given site to the control part 108.

The temperature detection part 109 comprises a resistor 109a and a temperature-sensitive element 109b.

The resistor 109a is connected to a power line applying the constant voltage Vcc at one end and to one end of the temperature-sensitive element 109b via a node N2 at the other end. The other end of the temperature-sensitive element 109b is connected to the negative terminal line L2. The temperature-sensitive element 109b is an element actually used for detecting the temperature and provided in contact with or near the given site of which the temperature is to be detected. Heated by the temperature of the given site, the temperature-sensitive element 109b has the resistance changed. Here, the temperature-sensitive element 109b is a thermistor.

The resistor 109a and temperature-sensitive element 109b are series-connected and the constant voltage Vcc is applied to them. The constant voltage Vcc is divided between the resistor 109a and temperature-sensitive element 109b. Consequently, electric signals having a voltage value divided between the resistor 109a and temperature-sensitive element 109b (temperature signals) are supplied to the control part 108 (A/D (analog/digital) converter 108c) from the node N2. The temperature-sensitive element 109b has the resistance changed according to the temperature. The voltage value of the temperature signals changes according to the temperature. The temperature of the given site is detected by measuring this voltage value.

The power switch part 101 is formed at a point on the positive terminal line L1 and a point on the negative terminal line L2. More specifically, it is provided between the battery 2 and voltage conversion part 103 and after the switch 133 when seen from the battery 2.

The power switch part 101 is controlled by control signals (power switch control signals) supplied from the control part 108, which will be described later. Supplied with the power control switch signals, the power switch part 101 makes the positive terminal line L1 conductive, whereby electric power is supplied to the motor 50 from the battery 2.

Furthermore, the power switch part 101 is supplied with battery overdischarge/overcurrent signals from the battery 2. When supplied with the battery overdischarge/overcurrent signals, the power switch part 101 makes the positive terminal line L1 nonconductive, whereby electric power supply to the motor 50 is stopped. In this way, when the battery 2 undergoes overdischarge/overcurrent, electric power supply to the motor 50 is stopped and the entire power circuit 12 is protected. The battery 2 is also protected.

The power switch part 101 comprises a FET 101a, registers 101b and 101c, and a FET 101b. The FET 101a is a p-channel type power MOSFET and the FET 101b is an n-channel type power MOSFET.

The FET 101a is provided at a point on the positive terminal line L1 and its source and drain are connected to the positive terminal line L1 in the manner that the source is closer to the switch 113. The resistor 101b is connected to the gate and source of the FET 101a. The gate of the FET 101a is further connected to one end of the resistor 101c. The other end of the resistor 101c is connected to the drain of the FET 101d. The source of the FET 101d is connected to the negative terminal line L2. The gate of the FET 101d is connected to the control part 108 and input terminal I3.

The FET 101d is turned on when the power switch control signals (here, they are high signals) are supplied from the control part 108 (output port 108b) to the gate of the FET 101d. Consequently, a current flows between the source and drain of the FET 101d. As a current flows, the gate of the FET 101a is connected to the negative terminal line L2 and low signals are supplied to the gate of the FET 101a, whereby the FET 101a is turned on. Consequently, the positive terminal line L1 becomes conductive and electric power supply to the motor 50 starts.

The FET 101d is turned off when battery overdischarge/overcurrent signals (low signals) are supplied from the battery 2 to the gate of the FET 101d. Consequently, no current flows between the source and drain of the FET 101d and no low signals are supplied to the gate of the FET 101a, whereby the FET 101a is turned off. Consequently, the positive terminal line L1 becomes nonconductive and electric power supply to the motor 50 is stopped, whereby the entire power circuit 12 is protected.

The voltage conversion part 103 receives an input voltage in accordance with the voltage output from the battery 2 (the output voltage from the battery 2), converts the received input voltage to generate a given voltage (the output voltage from the voltage conversion part 103), and outputs the generated output voltage to the motor 50 in a successive manner. Here, the voltage conversion part 103 receives the output voltage of the battery 2 as the input voltage. Here, the voltage conversion part 103 is a booster circuit boosting the output voltage of the battery 2 to an output voltage having a given voltage value. The voltage conversion part 103 is provided between the motor 50 and power switch part 101 (more specifically, between the voltage detection part 102 and voltage control part 104) and situated at a point on the positive terminal line L1 and at a point on the negative terminal line L2. The voltage conversion part 103 is, for example, a flyback booster circuit.

The voltage conversion part 103 increase/decreases (the degree of change in the voltage value is preset) or maintain the voltage value of the output voltage being generated according to control signals (voltage detection signals that will be described in detail later; the second signal) supplied from the voltage control part 104 so as to generate and output an output voltage having a target voltage value. Furthermore, the voltage conversion part 103 is supplied with control signals (voltage lowering signals that will be described in detail later) from the current detection part 105 or voltage detection part 102. Supplied with the voltage lowering signals, the voltage conversion part 103 decreases the voltage value of new output voltage being generated (the degree of change in the voltage value is preset; this degree can be the same as the above degree). In other words, the new output voltage being generated has a lowered voltage value. When supplied with the voltage lowering signals, the voltage conversion part 103 gives them priority over the voltage detection signals and generates a new voltage having a decreased voltage value.

The voltage conversion part 103 comprises, for example, a switching IC (integrated circuit) 103a, a FET 103b, a choke coil 103c, a diode 103d, and capacitors 103e and 103f.

The capacitor 103f is provided on the input side in the voltage conversion part 103 and connected to the positive terminal line L1 at one end and to the negative terminal line L2 at the other end. The capacitor 103f smoothes the input voltage applied to the voltage conversion part 103.

The switching IC 103a is connected to the positive terminal line L1, negative terminal line L2, FET 103b, voltage detection part 102, voltage control part 104, and current detection part 105. The source and drain of the FET 103b are connected to the negative terminal line L2 and positive terminal line L1, respectively. The choke coil 103c is provided at a point on the positive terminal line L1. The diode 103d is provided at a point on the positive terminal line L2 and connected to the choke coil 103c and drain of the FET 103e at one end.

The switching IC 103a is connected to the gate of the FET 103b. The switching IC 103a supplies high signals or low signals to this gate terminal and turns on/off of the FET 103b.

Here, the FET 103b is an n-channel type power MOSFET. When high signals are supplied to the gate of the FET 103b, the FET 103b is turned on, whereby a current flows between the source and drain of the FET 103b. When low signals are supplied to the gate of the FET 103b, the FET 103b is turned off, whereby no current flows between the source and drain of the FET 103b.

The choke coil 103c yields flyback effect as the FET 103b is turned on/off. By the flyback effect occurrence, the voltage between the terminals of the choke coil 103c is boosted. Consequently, the input voltage of the voltage conversion part 103 is converted (here, boosted) to generate and output a voltage of a given voltage value. In other words, with the switching IC 103a repeatedly turning on/off the FET 103b, the voltage conversion part 103 boosts the received input voltage by means of flyback effect of the choke coil 103c. Here, as the on/off switching duty ratio (one ON period (t)/one ON plus OFF period (T)) of the FET 103b is increased, the boosting amplitude of the input voltage is increased and the output voltage of the voltage conversion part 103 is increased.

The diode 103d rectifies the voltage boosted by the choke coil 103c.

The switching IC 103a switches the signals supplied to the gate of the FET 103b between high signals and low signals at a frequency corresponding to the voltage value of voltage detection signals supplied from the voltage control part 104. Here, the switching IC 103a compares the voltage value of the voltage detection signals to a given value (a preset value, which is termed 'the set value' hereafter), and switches the signals supplied to the gate of the FET 103b between high signals and low signals at a frequency corresponding to the comparative result.

For example, when the voltage detection signals have a voltage value lower than the set value, the switching IC 103a increases the signal duty ratio (the High period (t)/the period (T)) of high and low signals supplied to the FET 103b so as to increase the on/off switching duty ratio of the FET 103b. When the voltage detection signals have a voltage value higher than the set value, the switching IC 103a decreases the signal duty ratio of signals supplied to the FET 103b so as to decrease the on/off switching duty ratio of the FET 103b. When the voltage detection signals have a voltage value equal to the set value, the switching IC 103a maintains the signal duty ratio of signals supplied to the FET 103b so as to maintain the on/off switching duty ratio of the FET 103b.

The voltage detection signals are signals having a voltage value in accordance with the voltage value of the output voltage from the voltage conversion part 103. When the voltage detection signals have a voltage value lower than the set value, the voltage value of the output voltage from the voltage conversion part 103 is lower than a target voltage value. In such a case, the switching IC 103a increases the on/off switching duty ratio of the FET 103b so as to approximate the voltage value of new output voltage being generated (the output voltage from the voltage conversion part 103) to the target voltage value. On the other hand, when the voltage detection signals have a voltage value higher than the set value, the voltage value of the output voltage from the voltage conversion part 103 is higher than the target voltage value. In such a case, the switching IC 103a decreases the on/off switching duty ratio of the FET 103b so as to approximate the voltage value of new output voltage being generated to the target voltage value. Furthermore, when the voltage detection signals have a voltage value equal to the set value, the voltage value of the output voltage from the voltage conversion part 103 is equal to the target voltage value. In such a case, the switching IC 103a maintains the on/off switching duty ratio of the FET 103b so as to maintain the voltage value of new output voltage being generated.

The capacitor 103e is provided on the output side in the voltage conversion part 103 and connected to the positive terminal line L1 at one end and to the negative terminal line L2 at the other end. The capacitor 103e smoothes the output voltage output from the voltage conversion part 103.

Here, with the above structure, the voltage conversion part 103 repeatedly converts (boosts) the input voltage by means of flyback effect and outputs the converted output signals in a successive manner. Furthermore, the voltage conversion part 103 increases/decreases or maintains the on/off switching duty ratio of the FET 103b in accordance with the voltage value of the voltage detection signals. Repeating such operation successively, the voltage conversion part 103 changes or maintains the degree to which the input voltage is converted (the difference between the input voltage and output voltage of the voltage conversion part 103, which is termed 'the degree of conversion' hereafter) so as to generate an output voltage having a target voltage value based on the input voltage. The degree of change in the duty ratio is preset.

The switching IC 103a is further supplied with voltage lowering signals from the voltage detection part 102 or current detection part 105. The voltage lowering signals have a voltage value higher than the above set value. Therefore, supplied with the voltage lowering signals, the switching IC 103a reduces the on/off switching speed of the FET 103b to lower the voltage value (the degree of conversion) of new output voltage being generated by the voltage conversion part 103. Furthermore, the voltage value of the voltage lowering signals is sufficiently higher than the voltage value of the voltage detection signals. Therefore, even if the voltage lowering signals and voltage detection signals are simultaneously supplied to the switching IC 103a, the voltage detection signals are invalidated due to the voltage lowering signals (the control of the voltage control part 104 is invalidated) and the switching IC 103a lowers the voltage value of the new output voltage being generated according to the voltage lowering signals.

Here, with the above structure, supplied with voltage lowering signals, the voltage conversion part 103 decreases the on/off switching duty ratio of the FET 103b to lower the voltage value of the output voltage being generated after the voltage lowering signals are supplied. The degree of change in the duty ratio is preset (the degree of change can be the same as the above degree of change).

Since the voltage conversion part 103a converts the output voltage of the battery 2 to generate a given voltage as described above, the electric operating machine 1 allows a battery having a different voltage or capacitance to be used for the power source part 10.

The voltage control part 104 is provided after the voltage conversion part 103 when seen from the battery 2 and provides feedback on the voltage detection signals having a voltage value in accordance with the output voltage of the voltage conversion part 103 to the voltage conversion part 103. The voltage control part 104 is connected to the positive terminal and negative terminal lines L1 and L2. Furthermore, the voltage control part 104 is connected to the control part 108. Supplied with temperature detection signals from the control part 108, the voltage control part 104 mandatorily increases the voltage value of feedback voltage detection signals. Consequently, the voltage value of the output voltage of the voltage conversion part 103 tends to be decreased in comparison with before the temperature detection signals are supplied. When, for example, the voltage value of the output voltage is equal to a target voltage value, the voltage value of the output voltage of the voltage conversion part 103 is lower after the temperature detection signals are supplied than before the temperature detection signals are supplied.

The voltage control part 104 comprises resistors 104a, 104b, and 104c and a FET 194d. A node N3 connecting the resistors 104a and 104b is connected to the switching IC 103a. The voltage detection signals are output from the node N3.

The resistors 104a, 104b, and 104c are series-connected between the positive terminal and negative terminal lines L1 and L2. One end of the resistor 104a is connected to the positive terminal line L1. The source and drain of the FET 104d are connected to the negative terminal line L2 and one end of the resistor 104c, respectively. The gate of the FET 104d is connected to the control part 108 (output port 108d). The other end of the resistor 104c is connected to the negative terminal line L2. Here, the FET 104d is an n-channel type MOSFET.

The gate of the FET 104d is normally supplied with high signals from the control part 108 (output port 108d). Then, a current flows between the source and drain of the FET 104d. Then, the voltage value of the voltage detection signals is a value resulting from dividing the voltage value of the output voltage of the voltage conversion part 103 between the resistors 104a and 104b.

On the other hand, when the temperature detection signals (low signals) are supplied to the gate of the FET 104d, no current flows between the source and drain of the FET 104d. Then, the voltage value of the voltage detection signals is a value resulting from dividing the voltage value of the output voltage of the voltage conversion part 103 between the resistor 104a and the resistors 104b, and 104c. In other words, the voltage detection signals have a different voltage value depending on whether the temperature detection signals (low signals) are supplied or not, for the output voltage of the same voltage value. More specifically, when the temperature detection signals (low signals) are supplied, the voltage value of the voltage detection signals is increased. Therefore, the voltage value of the voltage detection signals tends to exceed the set value and the output voltage of the voltage conversion part 103 tends to be lowered. Then, when, for example, the voltage value of the output voltage is equal to a target voltage value, the voltage value of the voltage detection signals exceeds the set value and the output voltage of the voltage conversion part 103 becomes lower than before the temperature detection signals are supplied.

The voltage detection part 102 is provided between the power switch part 101 and voltage conversion part 103 and connected to the positive terminal line L1, negative terminal line L2, and voltage conversion part 103 (switching IC 103a). The voltage detection part 102 detects the output voltage of the battery 2 (the battery voltage) and, when the detected voltage value of the output voltage no longer satisfies a criterion A (for example, not higher than a threshold A), supplies to the voltage conversion part 103 voltage lowering signals (the first signal) that are signals for lowering the output voltage of the voltage conversion part 103.

The voltage detection part 102 comprises resistors 102a, 102b, 102c, and 102d, a comparator 102e, and a diode 102f.

The resistors 102a and 102b are series-connected. The resistor 102a is connected to the positive terminal line L1 at one end and to the minus terminal (−) of the comparator 102e and one end of the resistor 102b via a node N4 at the other end. The other end of the resistor 102b is connected to the negative terminal line L2.

The resistors 102c and 102d are series-connected. The resistor 102c is connected to a power line applying the constant voltage Vcc at one end and to the plus terminal (+) of the comparator 102e and one end of the resistor 102d via a node N5 at the other end. The other end of the resistor 102d is connected to the negative terminal line L2.

The output terminal of the comparator 102e is connected to the diode 102f and the diode 102f is connected to the voltage conversion part 103 (switching IC 103a).

The voltage between the positive terminal and negative terminal lines L1 and L2 (the voltage applied by the battery 2, namely the battery voltage) is divided between the resistors 102a and 102b. Signals having a divided voltage value are supplied to the minus terminal (−) of the comparator 102e from the node N4. The constant voltage Vcc is divided between the resistors 102c and 102d. Signals having the divided voltage value are supplied to the plus terminal (+) of the comparator 102e from the node N5.

The comparator 102e compares the voltage value of the signals supplied to the minus terminal (−) with the voltage value of the signals supplied to the plus terminal (+) and, when the voltage value of the signals supplied to the minus terminal (−) is lower than the voltage value of the signals supplied to the plus terminal (+), outputs voltage lowering signals (high signals) to the voltage conversion part 103 (switching IC 103a). In this comparison, the battery voltage is compared with a threshold A (a value in accordance with the voltage value of the signals supplied to the plus terminal (+)) to determine whether the battery voltage satisfies the criterion A.

The resistors 102a to 102d have such resistance values that the comparator 102e outputs high signals when the battery voltage is not higher than the threshold A. The threshold A is determined so that the current flowing from the battery 2 becomes excessively large when the magnitude (voltage value) of the battery voltage is not higher than the threshold A. The threshold A is preset.

The diode 102f rectifies the voltage lowering signals and prevents back-flow of a current from the output terminal of the comparator 102e to the comparator 102e.

The current detection part 105 is provided at a point on the negative terminal line L2 between the voltage conversion part 103 and motor 50 (more specifically, between the voltage control part 104 and motor 50) and connected to the voltage conversion part 103 (switching IC 103a). The current detection part 105 detects the current flowing through the motor 50 (the motor current) and, when the detected magnitude (the current value) of the motor current satisfies a criterion B (for example, higher than a threshold B), supplies to the voltage conversion part 103 (switching IC 103a) voltage lowering signals for lowing the output voltage of the voltage conversion part 103.

Here, the voltage lowering signals are output before the battery overdischarge/overcurrent signals output from the battery 2, for example, when the current flowing through the motor 50 increases in the no-load state.

The current detection part 105 comprises a diode 105a, a comparator 105b, and resistors 105c, 105d, 105e, 105f, and 105g.

The resistor 105g is provided at a point on the negative terminal line L2 and connected to the motor at one end. The resistor 105g is used to detect a current flowing through the motor 50. The one end of the resistor 105g is connected to one end of the resistor 105c. The other end of the resistor 105c is connected to the plus terminal (+) of the comparator 105b.

The resistors 105f and 105e are series-connected. The resistor 105f is connected to a power line applying the constant voltage Vcc at one end and to the minus terminal (−) of the comparator 105b and one end of the resistor 105e via a node N6 at the other end. The other end of the resistor 105e is connected to the negative terminal line L2.

The output terminal of the comparator 105b is connected to the diode 105a. The diode 105a is connected to the voltage conversion part 103 (switching IC 103a).

Signals having the voltage value between the both ends of the resistor 105g (the voltage value proportional to the current flowing through the resistor 105g) are supplied to the plus terminal of the comparator 105b via the resistor 105c. The constant voltage Vcc is divided between the resistors 105f and 105e. Signals having a divided voltage value are supplied to the minus terminal (−) of the comparator 105b from the node N6.

The comparator 105b compares the voltage value of the signals supplied to the minus terminal (−) with the voltage value of the signals supplied to the plus terminal (+) and, when the voltage value of the signals supplied to the plus terminal (+) is higher than the voltage value of the signals supplied to the minus terminal (−), outputs voltage lowering signals (high signals) to the voltage conversion part 103 (switching IC 103a). In this comparison, the motor current (the current flowing through the resistor 105g) is compared with a threshold B (a current value in accordance with the voltage value of the signals supplied to the plus terminal (+)) to determine whether the motor current satisfies the criterion B or not.

The resisters 105c to 105g have such resistance values that the comparator 105b outputs high signals when the motor current exceeds the threshold B. The threshold B is determined so that the motor current becomes excessively large when the magnitude (the current value) of the motor current exceeds the threshold B. The threshold B is preset.

The diode 105a rectifies the voltage lowering signals and prevents back-flow of a current from the output terminal of the comparator 105b to the comparator 105b.

The current amplifying part 110 outputs to the control part 108 signals having a voltage value in accordance with the current value of the motor current as current detection signals. The current amplifying part 110 is connected to the current detection part 105.

The current amplifying part 110 comprises an amplifier 110a and resistors 110b, 110c, and 110d.

The resistor 110d is connected to the one end of the resistor 105g that is closer to the motor 50 at one end and to the plus terminal (+) of the amplifier 110a at the other end. The resistor 110c is connected to the other end of the resistor 105g at one end and to the minus terminal (−) of the amplifier 110a at the other end. The resistor 110b is connected to the output terminal of the amplifier 110a at one end and to the minus terminal (−) of the amplifier 110a at the other end. Furthermore, the amplifier 110a is connected to the control part 108 (A/D converter 108c).

With the above structure, the amplifier 110a amplifies the voltage in accordance with the current value of the motor current (the potential difference between the both ends of the resistor 105g). The amplifier 110a outputs to the control part 108 (A/D converter 108c) signals having the amplified voltage value as current detection signals.

The control part 108 comprises a not-shown CPU (central processing unit), ROM (read only memory), RAM (random access memory), and the like. The ROM stores programs and data. According to the programs stored in the ROM, or using the data stored in the ROM, the CPU actually executes the processes to be executed by the control part 108. The RAM serves as a main memory for the CPU.

The control part 108 further comprises an input port 108a, an output port 108b, an A/D converter 108c, an output port 108d, and a power source part 108e.

With switch state detection signals being supplied to the input port 108a, the control part 108 (CPU) starts supplying power switch control signals from the output port 108b to the power switch part 101 (FET 101d). Power supply to the motor 50 is started.

The power source part 108e is applied the constant voltage Vcc, whereby the power source part 108e operates.

The A/D converter 108c receives temperature signals and converts the received temperature signals to digital data (temperature data). The temperature data are data specifying the temperature detected by using the temperature detection part 109, indicating a voltage value in accordance with the temperature (the voltage value of the temperature signals). The control part 108 (CPU) acquires the converted temperature data, whereby it is assumed that the control part 108 detects the temperature of the given site of the electric operating machine 1. The control part 108 (CPU) compares the voltage value indicated by the temperature data with a threshold C and, when the voltage value is higher than the threshold C (when the temperature specified by the temperature data satisfies (is higher than) a criterion C), supplies temperature detection signals (low signals) from the output port 108d to the voltage control part 104 (the gate of the FET 104d). Consequently, the voltage value of the voltage detection signals output from the voltage control part 104 is increased and the output voltage of the voltage conversion part 103 tends to be lowered. Here, the control part 108 normally outputs high signals from the output port 108d.

The A/D converter 108c receives current detection signals and converts the received current detection signals to digital data (current data). The current data are data specifying the current amplified by the current amplifier 110, indicating the voltage value amplified by the current amplifier 110 (in other words, the amplified current value is indicated by this voltage value). The control part 108 (CPU) acquires the converted current data, whereby it is assumed that the control part 108 (CPU) detects the motor current. The control part 108 (CPU) compares the voltage value indicated by the current data with a threshold D and, when the voltage value is higher than the threshold D for a given period of time (when the motor current satisfies (is higher than) a criterion D for the given period of time), stops supply of the power switch control signals from the output port 108*b*. In other words, the control part 108 supplies low signals from the output port 108*b* to the power switch part 101 (the gate of the FET 104*d*). Consequently, the power switch part 101 makes the positive terminal line L1 nonconductive to stop electric power supply to the motor 50 as in the case of the battery overdischarge/overcurrent signals being supplied. Here, the criterion D can be the same criterion as the criterion B.

Figure 7:
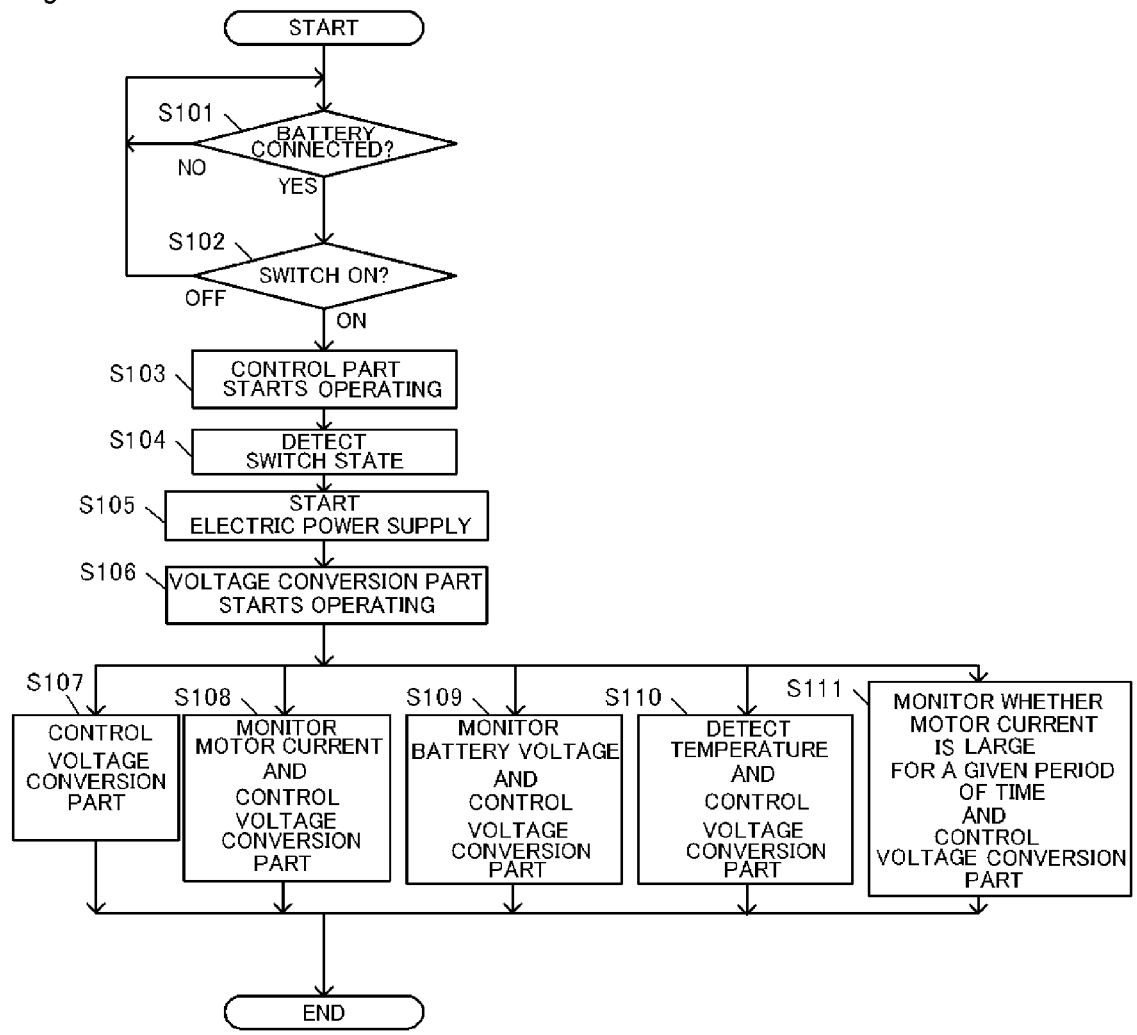
FIG. 7 is a flowchart for explaining the operation of the power circuit of the electric operating machine according to Embodiment 1 of the present invention.

Operation of the power circuit 12 will be described hereafter with reference to FIG. 7. The power circuit 12 does not operate before the battery 2 is connected and the switch 113 is turned on (Step S101; NO and Step S102; OFF). When the battery 2 is connected to the power circuit 12 and the trigger lever 22 is pulled to turn on the switch 113 (Step S101; YES and Step S102; ON), the control power source part 106 generates a constant voltage Vcc and outputs it to the control part 108, whereby the control part 108 starts operating (Step S103). Furthermore, with switch state detection signals being supplied from the switch detection part 107 to the control part 108, the control part 108 detects the switch state (ON state) (Step S104). Detecting the ON state, the control part 108 supplies power switch control signals to the power switch part 101. Then, the power switch part 101 makes the positive terminal line L1 conductive to start electric power supply from the battery 2 to the motor 50.

Once the electric power supply starts, the voltage conversion part 103 starts operating (Step S106). After Step S106, the power circuit 12 performs the procedures of Step S107 and other steps in parallel.

In Step S107, the voltage conversion part 103 continuously repeats conversion from input voltage to output voltage. Here, the voltage conversion part 103 repeatedly increases/decreases or maintains the voltage value of the output voltage in accordance with the voltage detection signals supplied from the voltage control part 104 so as to generate and output an output voltage having a target voltage value. This operation is repeated until the switch 113 is turned off or the power switch part 101 stops electric power supply to the motor 50. Here, the power switch part 101 stops electric power supply to the motor 50 when supplied with the battery overdischarge/overcurrent signals form the battery 2.

In Step S108, the current detection part 105 detects the motor current, constantly monitors the current value of the motor current for whether the value satisfies a criterion B (by the above comparison), and outputs the voltage lowering signals when the current value satisfies the criterion B. Supplied with the voltage lowering signals, the voltage conversion part 103 generates a voltage having a lowered voltage value lower than the voltage value of the output voltage generated before the voltage lowering signals are supplied (the extent to which the voltage value is lowered is preset). Here, the procedure of lowering the voltage value in Step S108 has priority over the procedure in Step in S107 as described above. This procedure results in reducing the current flowing from the voltage conversion part 103. This procedure is repeated until the switch 113 is turned off or the power switch part 101 stops electric power supply to the motor 50.

Furthermore, in Step S109, the voltage detection part 102 detects the battery voltage, constantly monitors the voltage value of the battery voltage for whether the voltage value satisfies a criterion A (by the above comparison), and outputs the voltage lowering signals when the voltage value no longer satisfies the criterion A. Supplied with the voltage lowering signals (here, signals having the same voltage value as the voltage lowering signals output from the current detection part 105), the voltage conversion part 103 makes the voltage value of the output voltage being generated after the voltage lowering signals are supplied lower than the voltage value of the output voltage generated before the voltage lowering signals are supplied (the extent to which the voltage value is lowered is preset). Here, the procedure of lowering the voltage value in Step S109 has priority over the procedure in Step in S107 as described above. This procedure is repeated until the switch 113 is turned off or the power switch part 101 stops electric power supply to the motor 50.

Furthermore, in Step S110, the control part 108 detects the temperature of a given site of the electric operating machine 1 using the temperature detection part 109, constantly monitors the detected temperature for whether the temperature satisfies a criterion C, and outputs temperature detection signals to the voltage control part 104 when the voltage value satisfies the criterion C. Supplied with the temperature detection signals, the voltage control part 104 increases the voltage value of the voltage detection signals to output. In this way, the output voltage of the voltage conversion part 103 tends to be lowered. This procedure is repeated until the switch 113 is turned off or the power switch part 101 stops electric power supply to the motor 50.

In Step S111, the control part 108 detects the motor current based on the current data based on the current detection signals output from the current amplifying part 110, monitors the motor current for whether the current satisfies a criterion D for a given period of time (see the above comparison), and, when the motor current satisfies the criterion D for the given period of time, controls the power switch part 101 to make the positive terminal line L1 nonconductive so as to stop electric power supply to the motor 50. Then, the power switch part 101 stops electric power supply to the motor 50.

With the above exemplary structure, the power circuit 12 of this embodiment comprises the voltage conversion part 103 converting an input voltage entered in accordance with the battery voltage of the battery 2 to generate an output voltage and outputting the generated output voltage to the motor 50 in a successive manner and the current detection part 105 outputting voltage lowering signals in accordance with the current flowing through a given part of the power circuit 12 (here, the current flowing through the motor 50 (the motor current); in other words, the given part of the power circuit 12 is a wire within the power circuit 12 that is connected to the motor 50). Then, with the above exemplary structure, the voltage conversion part 103 lowers the voltage value of new output voltage being generated when the current detection part 105 outputs voltage lowering signals.

With the above structure, the voltage value of the output voltage of the voltage conversion part 103 can be lowered in accordance with the current flowing through the motor 50, preventing the current flowing through the motor 50 from becoming large. Then, the chance that a large current flows through at least a part of the power circuit 12 and the motor 50 is eliminated or reduced. Therefore, the electric operating machine 1 of this embodiment is an electric operating machine having the motor 50 and power circuit 12 (here, particularly the motor 50) properly protected. Particularly, even if the motor 50 undergoes a high load, the chance that a large current flows is eliminated or reduced, whereby the electric operating machine 1 of this embodiment machine is an electric operating machine having the motor 50 and power circuit 12 properly protected.

Particularly, in the electric operating machine 1 of this embodiment, the rotary blade 42 is heavy and a large current tends to flow through the motor 50. However, the voltage value of the output voltage has an upper limit and the rotation speed is limited. The rotation speed of the rotary blade 42 is gradually increased. Therefore, the effect of protecting the motor 50 is obtained.

Furthermore, the electric operating machine 1 of this embodiment is structured to receive control signals (battery overdischarge/overcurrent signals) indicating abnormal states of the battery 2 from the battery 2, and stop electric power supply to the motor 50. The threshold is determined so that when the current supplied to the motor 50 is increased, the voltage lowering signals are output from the current detection part 105 before the battery overdischarge/overcurrent signals are output from the battery 2. Therefore, the chance that the motor 50 stops because of the overdischarge/overcurrent signals being output is eliminated or reduced. Furthermore, even if the current detection part 105 does not work due to failure or the like, outputting the battery overdischarge/overcurrent signals from the battery 2 will minimize the chance that a large current flows through the motor 50 and power circuit 12.

In the power circuit 12 of this embodiment, with the above exemplary structure, the current detection part 105 outputs voltage lowering signals when the magnitude of the current value of the current flowing through the motor 50 satisfies a criterion B. Then, the voltage value of the output voltage of the voltage conversion part 103 is lowered when the current flowing through the motor 50 is increased. Then, the chance that a large current flows is eliminated or reduced.

Here, it is supposed that the current detection part 105 is provided between the battery 2 and voltage conversion part 103 and only the current before the voltage conversion is monitored. If, for example, a battery having a large battery voltage is attached as the battery 2 so that the total output is large, a large current may flow through the motor 50 even though the current before the voltage conversion is small because the voltage output from the voltage conversion part 103 is constant. Therefore, in this embodiment, the current detection part 105 is provided between the voltage conversion part 103 and motor 50. In this way, the current flowing through the motor 50 can precisely be detected without depending on the battery voltage, proper protection is available.

Particularly, the conductor patterns formed on the printed wiring boards of the motor 50 of this embodiment may cause problems such as melt due to heat depending on the thickness. The above structure can prevent such problems and improves the life-span of the motor 50.

Furthermore, the motor 50 has a disc shape in which the magnetic flux passes through the printed wiring boards on which coil segments 92 are formed as described above in the axial direction. Then, a lightweight and large torque electric operating machine can be constituted.

Furthermore, in the electric operating machine 1 of this embodiment, the rotary blade 42 is directly connected to and driven by the output shaft 52 of the motor 50; in other words, the rotary blade 42 is directly driven via no gears or the like. Therefore, mechanical loss is reduced and noise is prevented because no gear sound occurs. When the motor 50 and rotary blade 42 are directly connected as in this case, the motor 50 is required to produce a large torque to start rotating the rotary blade 42 because the rotary blade 42 is heavy. For this reason, the current of the battery 2 may abruptly be increased. The power circuit 12 of this embodiment eliminates or reduces the chance that a large current flows through the motor 50. Therefore, an electric operating machine 1 having a regulation part inhibiting an excessively large current from flowing through the battery 2 can be constituted.

In the power circuit 12 of this embodiment, with the above exemplary structure, supplied with the voltage lowering signals, the voltage conversion part 103 lowers the voltage value of the output voltage generated by the voltage conversion part 103.

In the power circuit 12 of this embodiment, with the above exemplary structure, the power circuit 12 further comprises the voltage control part 104 outputting (doing feedback) signals having the voltage value in accordance with the output voltage output from the voltage conversion part 103 (the voltage detection signals) to the voltage conversion part 103 and, when no voltage lowering signals are supplied, the voltage conversion part 103 successively generates an output voltage having a voltage value in accordance with the voltage detection signals. With this structure, the output voltage of the voltage conversion part 103 become a target voltage (a voltage intended to apply to the motor 50 (the drive voltage of the motor 50)) and stabilizes at the target voltage and the voltage conversion part 103 mandatorily lowers the output voltage when the voltage lowering signals are supplied, whereby the power circuit 12 is properly protected.

In the power circuit 12 of this embodiment, with the above exemplary structure, the power circuit 12 controls the power switch part 101 to stop electric power supply from the battery 2 to the motor 50 when the current value of the current flowing through the motor 50 satisfies a criterion D for a given period of time. Consequently, if a large current flows through the motor 50 for the given period of time (for example, the rotary blade 42 has caught something and a high load is applied to the motor 50), the supply of electric power to the motor 50 is stopped. Therefore, the chance that a large current flows through the motor 50 and at least a part of the power circuit 12 is eliminated or reduced. Then, the electric operating machine 1 of this embodiment is an electric operating machine having the motor 50 and power circuit 12 properly protected.

In the power circuit 12 of this embodiment, with the above exemplary structure, the power circuit 12 further comprises the voltage detection part 102 outputting voltage lowering signals in accordance with the battery voltage of the battery 2. Furthermore, the voltage conversion part 103 changes (lowers) the voltage value of new output voltage being generated when the voltage detection part 102 outputs the voltage lowering signals. In this way, the voltage conversion part 103 changes (lowers) the voltage value of new output voltage being generated in accordance with the battery voltage.

As the battery voltage becomes low, the voltage conversion part 103 converts (boosts) the voltage at a higher amplitude and a large current may flow through the voltage conversion part 103 and the like. Particularly, a lithium ion battery exemplified as the battery 2 of this embodiment characteristically has a battery voltage largely fluctuating and tends to cause voltage drop during operation. With the above structure, the voltage value of the output voltage of the voltage conversion part 103 is lowered in accordance with the battery voltage of the battery 2, preventing the current flowing through the voltage conversion part 103 and the like from becoming large. Then, the electric operation machine 1 of this embodiment is an electric operation machine having the power circuit 12 properly protected. Furthermore, with the voltage value of the output voltage of the voltage conversion part 103 being lowered, the output voltage of the battery 2 is restored.

Furthermore, the electric operation machine 1 of this embodiment allows batteries different in voltage or capacitance to be used for the power source part 10, which is useful because the battery can be changed depending on workability or a battery in hand can be used. Furthermore, batteries significantly different in output voltage (for example, 14 V to 36 V) are available on the market. Even though such batteries significantly different in battery voltage are used (particularly, a battery with a low battery voltage is used), the voltage conversion part 103 does not bear a large workload.

In the power circuit 12 of this embodiment, with the above exemplary structure, the voltage detection part 102 outputs the voltage lowering signals when the magnitude of the voltage value of the battery voltage does not satisfy a given criterion. In this way, when the battery voltage becomes low, the voltage value of the output voltage of the voltage conversion part 103 is changed (lowered), preventing the current flowing through the voltage conversion part 103 and the like from becoming large.

In the power circuit 12 of this embodiment, with the above exemplary structure, the voltage conversion part 103 lowers the voltage value of the output voltage when the voltage lowering signals are supplied from the voltage detection part 102.

In the power circuit 12 of this embodiment, with the above exemplary structure, the voltage conversion part 103 generates an output voltage having a voltage value in accordance with the voltage detection signals output from the voltage control part 104 when no voltage lowering signals are supplied. With this structure, the voltage conversion part 103 mandatorily lowers the voltage value of the output voltage when the voltage lowering signals are supplied, properly preventing the power circuit 12.

Furthermore, in the power circuit 12 of this embodiment, with the above exemplary structure, the power circuit 12 comprises the temperature detection part 109 for detecting the temperature of a given site of the electric operating machine 1 and the control part 108 detecting the temperature of the given site using the temperature detection part 109. The control part 108 lowers the applied voltage applied to the motor 50 when the detected temperature using the temperature detection part 109 satisfies a criterion C. Consequently, the current value of the current flowing through the motor 50 is also lowered.

The given site is, for example, an circuit element of the power circuit 12 such as the FET 103b of the voltage conversion part 103 of the power circuit 12. With the applied voltage applied to the motor 50 being lowered, the load on the circuit element (for example, the switching intervals of the FET 103b) is diminished, whereby the circuit element is less heated and the power circuit 12 is properly protected.

Furthermore, the given site can be, for example, the motor 50. In such a case, with the applied voltage applied to the motor 50 being lowered, the current flowing through the motor (the current flowing through the power circuit 12) is diminished, reducing heat generation in the motor 50, whereby the motor 50 is properly protected from heat. The power circuit 12 is also protected as appropriate.

With the above structure, the given site is protected from heat and the members of the electric operating machine 1 are properly protected.

In the power circuit 12 of this embodiment, the applied voltage is the output voltage generated by the voltage conversion part 103. In this way, the applied voltage applied to the motor 50 can be lowered.

In the power circuit 12 of this embodiment, with the above exemplary structure, the control part 108 controls the voltage control part 104 so as to control the voltage value of the voltage detection signals output from the voltage control part 104 for lowering the applied voltage applied to the motor 50. In this way, the applied voltage applied to the motor 50 can properly be lowered.

(Embodiment 2)

Figure 8:
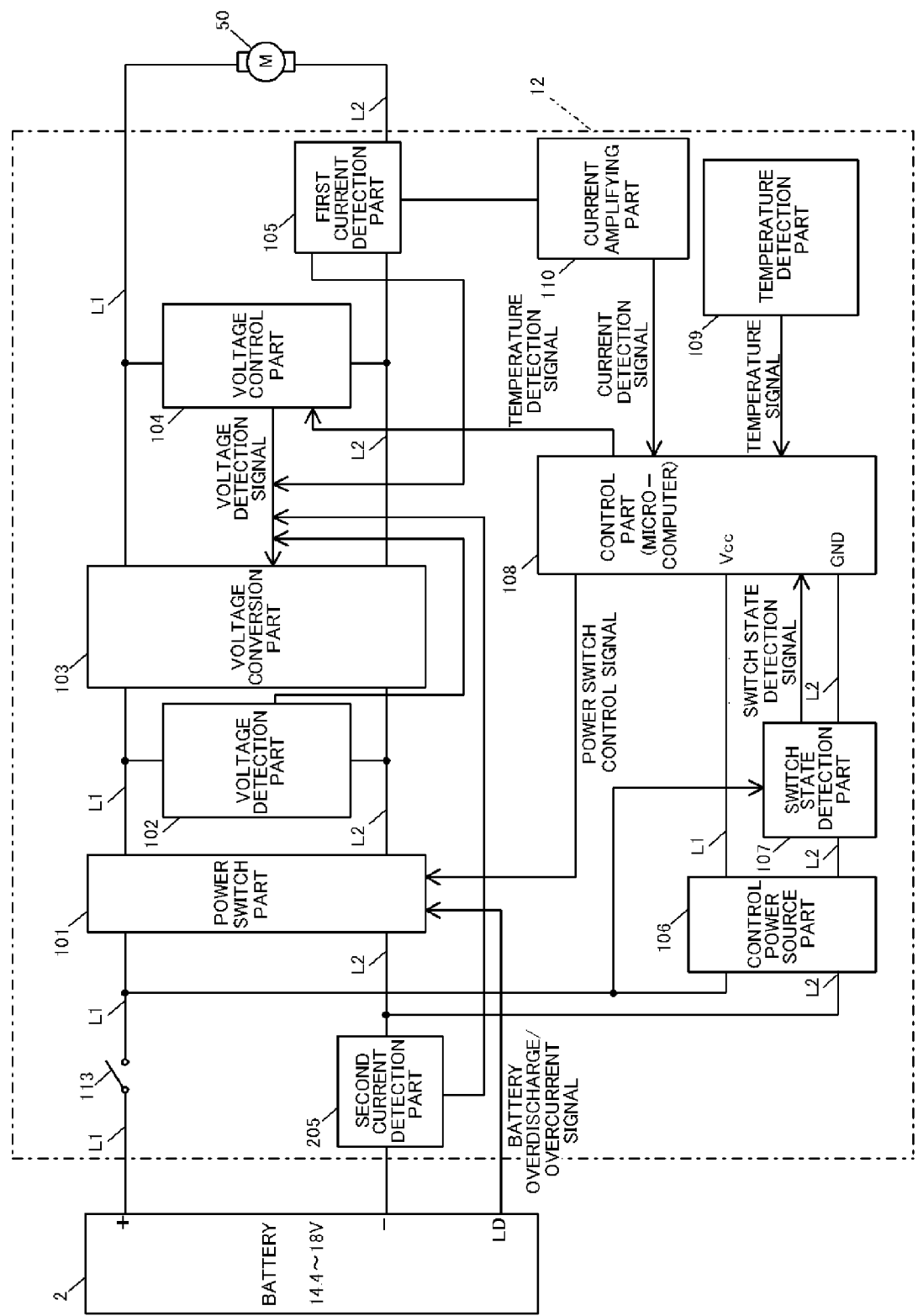
FIG. 8 is a block diagram for explaining the configuration of the power circuit of the electric operating machine according to Embodiment 2 of the present invention.
Figure 9:
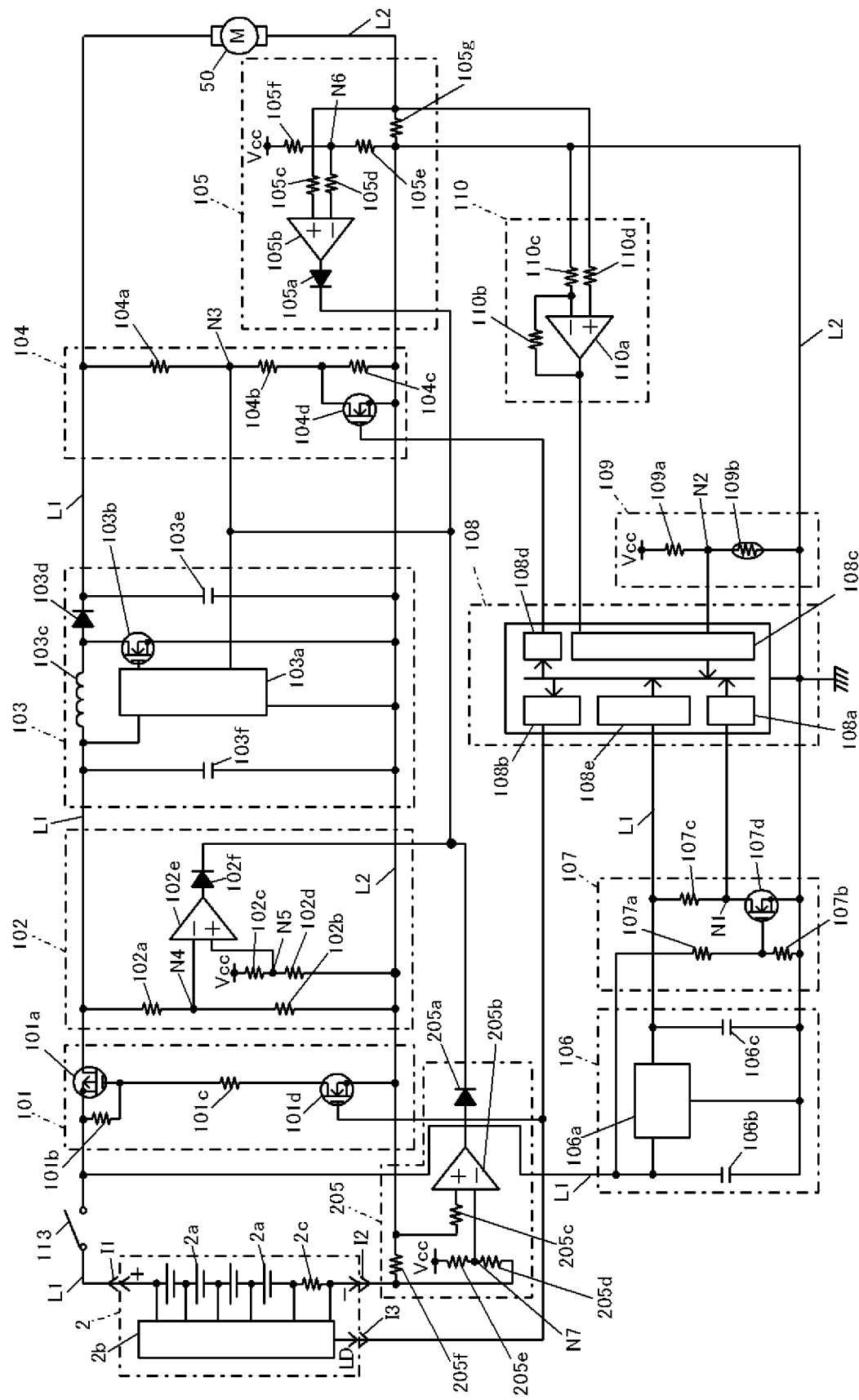
FIG. 9 is a circuit diagram for explaining an exemplary power circuit of the electric operating machine according to Embodiment 2 of the present invention.

Embodiment 2 of the present invention will be described hereafter with reference to FIGS. 8 and 9. Embodiment 2 is different from Embodiment 1 in the power circuit. The power circuit 12 according to Embodiment 2 comprises a second current detection part 205 in addition to the structure of the power circuit 12 of Embodiment 1. The other structure of the power circuit 12 is the same as in Embodiment 1 and will not be described. The current detection part 105 is referred to as the first current detection part 105 but is the same in operation and structure.

The second current detection part 205 is provided at a point on the negative terminal line L2 before the voltage conversion part 103 when seen from the battery 2 (more precisely, before the power switch part 101) and connected to the voltage conversion part 103 (switching IC 103a). The second current detection part 205 detects a current flowing between the battery 2 and voltage conversion part 103 (the battery current) and, when the magnitude (current value) of the detected battery current satisfies a criterion B (for example, higher than a threshold B), supplies to the voltage conversion part 103 (switching IC 103a) voltage lowering signals for lowering the output voltage of the voltage conversion part 103. When supplied with the voltage lowering signals from the second current detection part 205, the voltage conversion part 103 operates in the same manner as when it is supplied with the voltage lowering signals from the first current detection part 105; therefore, the explanation is omitted (see Embodiment 1).

The second current detection part 205 comprises a diode 205a, a comparator 205b, and resistors 205c, 205d, 205e, and 205f.

The resistor 205f is provided at a point on the negative terminal line L2 and connected to the input terminal I2 (the battery 2) at one end. The resistor 205f is used to detect the current flowing between the battery 2 and voltage conversion part 103. The other end of the resistor 205f is connected to one end of the resistor 205c. The other end of the resistor 205c is connected to the plus terminal (+) of the comparator 205b.

The resistors 205d and 205e are series-connected. The resistor 205e is connected to a power line applying the constant voltage Vcc at one end and to the minus terminal (−) of the comparator 205b and one end of the resistor 205d via a node N7 at the other end. The other end of the resistor 205d is connected to the negative terminal line L2 and the other end of the resistor 205f.

The output terminal of the comparator 205b is connected to the diode 205a and the diode 205a is connected to the voltage conversion part 103 (switching IC 103a).

Signals having the voltage value between the both ends of the resistor 205f (a voltage value proportional to the current flowing through the resistor 205) are supplied to the plus terminal of the comparator 205b via the resistor 205c. The constant voltage Vcc is divided between the resistors 105e and 105d. The signals having a divided voltage value are supplied to the minus terminal (−) of the comparator 205b from the node N7.

The comparator 205b compares the voltage value of the signals supplied to the minus terminal (−) with the voltage value of the signals supplied to the plus terminal (+) and, when the voltage value of the signals supplied to the plus terminal (+) is higher than the voltage value of the signals supplied to the minus terminal (−), outputs voltage lowering signals (high signals) to the voltage conversion part 103 (switching IC 103*a*). In this comparison, the battery current (the current flowing through the resistor 205*f*) is compared with a threshold B (a current value in accordance with the voltage value of the signals supplied to the plus terminal (+)) to determine whether the battery current satisfies the criterion B or not.

The resistors 205*c* to 205*f* have such resistance values that the comparator 105*b* outputs high signals when the motor current exceeds the threshold B. The threshold B is determined so that the motor current becomes excessively large when the magnitude (the current value) of the motor current exceeds the threshold B. The threshold B is preset. The threshold and the above criterion can be different from the threshold B and criterion B.

The diode 205*a* rectifies the voltage lowering signals and prevents back-flow of a current from the output terminal of the comparator 205*b* to the comparator 205*b*.

In the power circuit 12 of this embodiment, with the above exemplary structure, the second current detection part 205 outputting voltage lowering signals in accordance with the battery current is provided. Then, with the above exemplary structure, the voltage conversion part 103 lowers the voltage value of new output voltage being generated when the second current detection part 205 outputs the voltage lowering signals.

With the above structure, the voltage value of the output voltage of the voltage conversion part 103 is lowered in accordance with the current flowing between the battery 2 and voltage conversion part 103 (when the current value is large enough to satisfy the criterion B), preventing the current flowing between the battery 2 and voltage conversion part 103 from becoming large. In this way, the chance that a large current flows through at least a part of the power circuit 12 is eliminated or reduced. Then, the electric operation machine 1 of this embodiment will be an electric operating machine having the power circuit 12 and motor 50 (here, particularly the power circuit 12) properly protected. Particularly, double protection is provided by the first and second current detection part 105 and 205.

(Embodiment 3)

Figure 10:
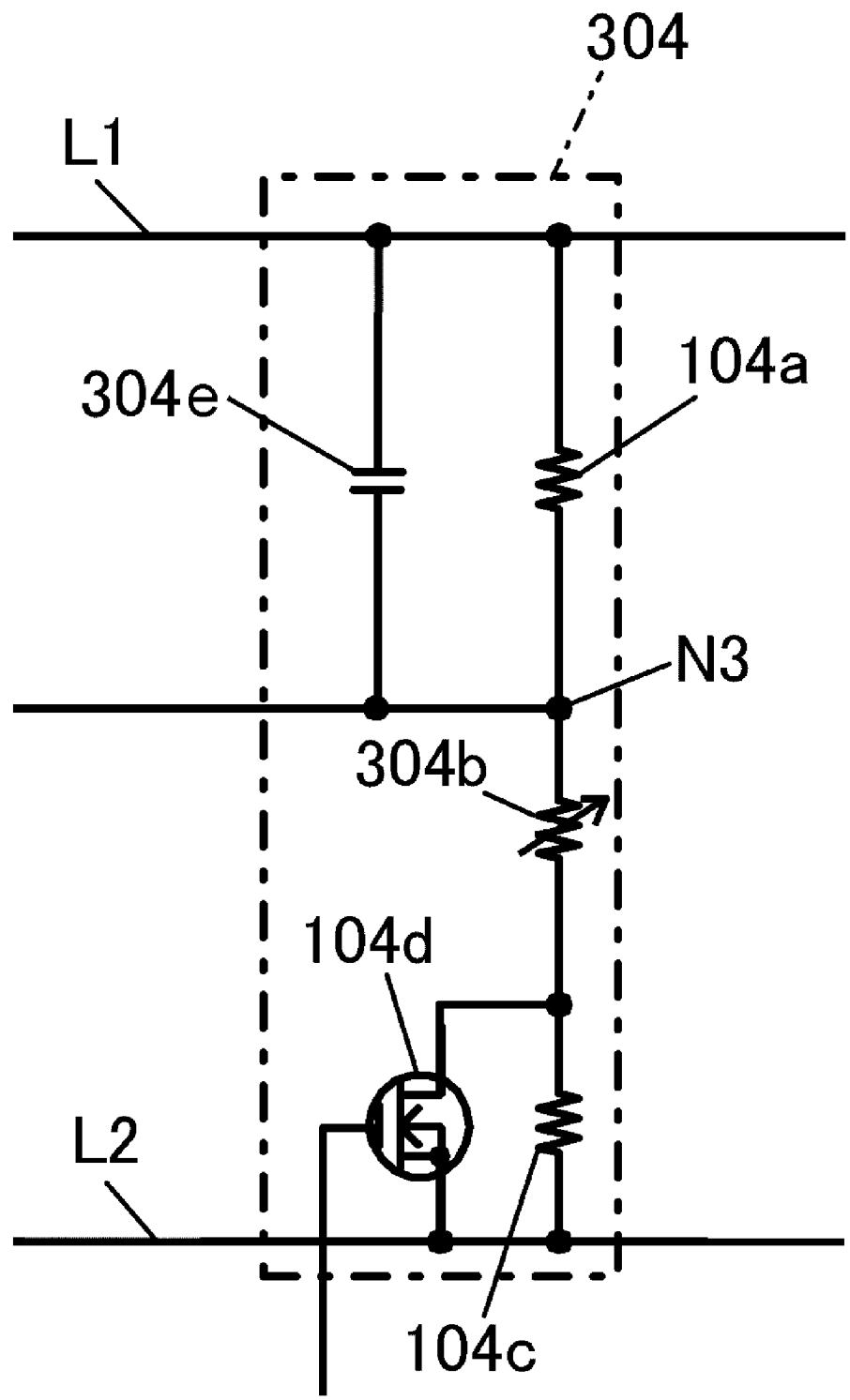
FIG. 10 is a circuit diagram for explaining an exemplary power circuit of the electric operating machine according to Embodiment 3 of the present invention.
Figure 11:
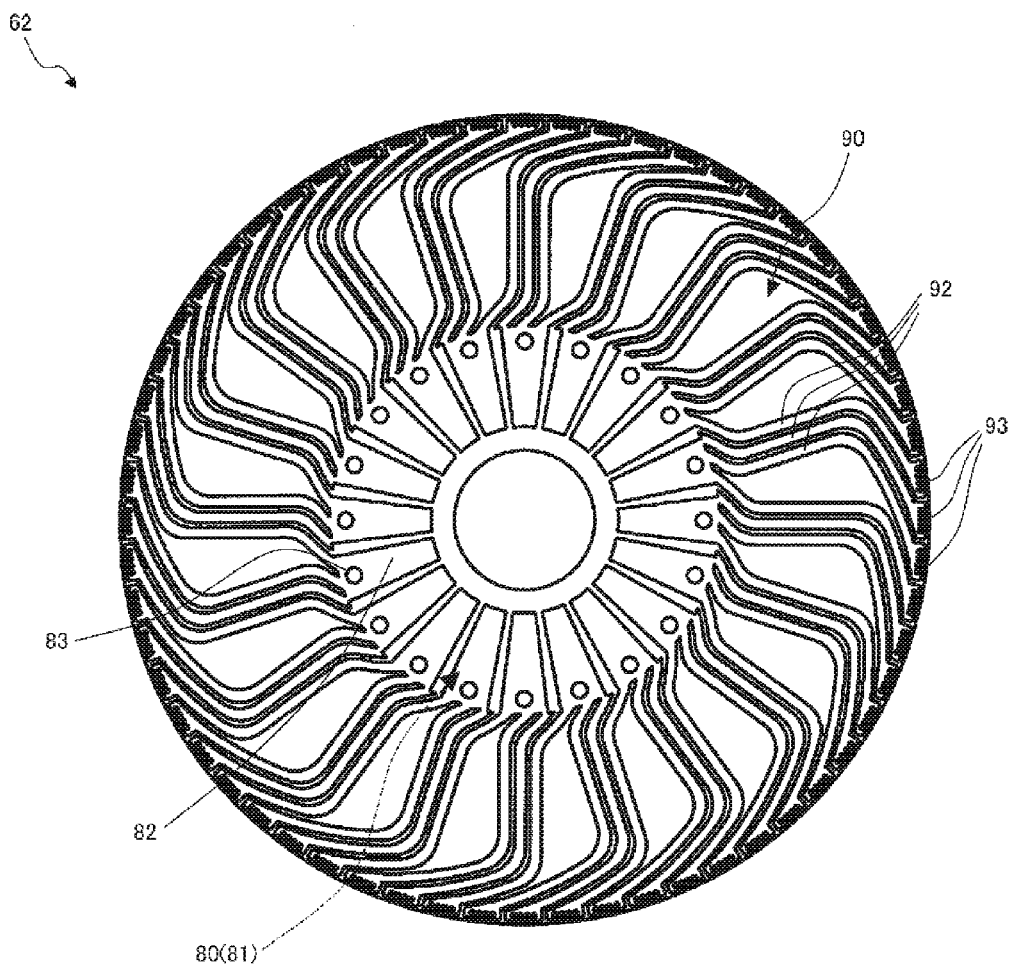
FIG. 11 is a top view of the coil/commutator disk of the rotor in FIG. 3
Figure 12:
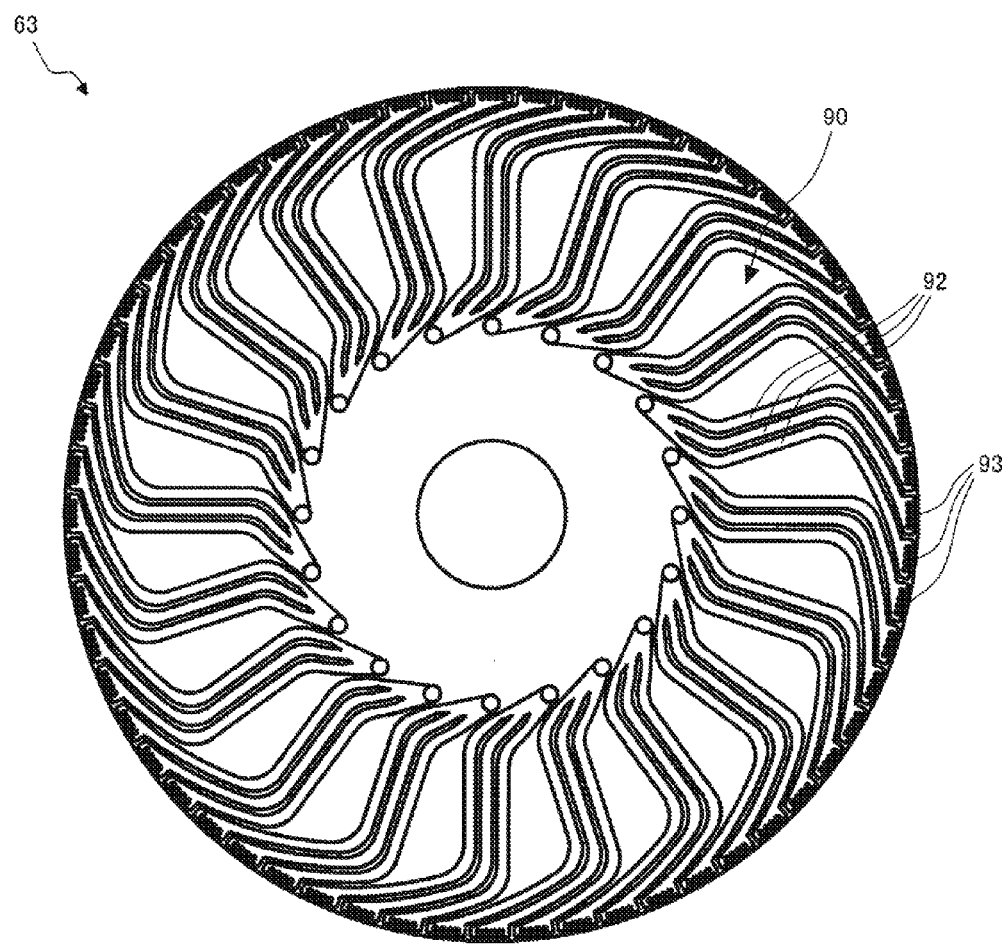
FIG. 12 is a top view of the coil disk part of the rotor in FIG. 3.

Embodiment 3 of the present invention will be described hereafter with reference to FIG. 10. Embodiment 3 is different from Embodiment 1 in the voltage control part of the power circuit 12. A voltage control part 304 according to Embodiment 3 comprises a capacitor 304*e* in addition to the structure of the voltage control part 104 according to Embodiment 1 and a resistor 304*b* consists of a variable resistor. The other structure of the power circuit 12 is the same as in Embodiment 1 and will not be described.

In this embodiment, the resistor 304*b* consists of a variable resistor. With the resistance value of the resistor 304*b* being changed, the voltage value of the voltage detection signals in accordance with the output from the voltage conversion part 103 can be changed. Therefore, the effect of changing the target value of the voltage conversion part 103 can be obtained. The resistor 104*b* can be operated from outside the power source housing 11 (not shown) and the operator can change the resistance value of the resistor 304*b* on an arbitrary basis.

The capacitor 104*e* mandatorily increases the voltage value of voltage detection signals for feedback upon start-up of the power switch part 101. And then, the voltage value of the voltage detection signals are gradually shifted to the voltage value in accordance with the output voltage of the voltage conversion part 103. With the above structure, the voltage applied to the motor 50 is gradually increased upon start-up of the power switch part 101, whereby a so-called soft start mechanism (regulation part) can be constituted.

In the electric operation machine 1 of this embodiment, the output signals output from the voltage conversion part 103 are changed on an arbitrary basis, whereby a desired rotation speed can be obtained. For example, even if a cutter with a nylon cord is attached in place of the rotary blade 42 mounted on the electric operation machine 1 in this embodiment, a smooth operation is ensured.

Furthermore, although a large current tends to flow through the motor 50 when the rotary blade 42 is activated in the electric operation machine 1 of this embodiment, the soft start mechanism that works only at the start-up gradually increases the voltage applied to the motor 50, inhibiting an excessively large current from flowing through the battery 2. Consequently, the load on the motor 50 and power circuit 12 is further reduced and the battery 2 is protected at the start-up.

(Modification)

In the above embodiments, the electric operation machine is applied to an electric mowing machine having an electric motor (the motor 50). The present invention is applicable to any electric equipment and extensively applied to other operating machines using an electric motor. Particularly, the present invention is suitable for those in which the rotation of an electric motor is directly transferred to the working tool (rotary blade, fan, etc.) via no reduction gears such as sanders, polishers, routers, and dust collectors. In the motor 50, the rotor 52 is exchangeable with the stator 54 in structure. That is, either one of the rotor 53 and the stator 54 comprises a disc-shaped coil substrate having multiple coil segments arranged in the circumferential direction about said output shaft when seen in the axial direction of said output shaft, and the other of said rotor and stator comprises a magnet generating a magnetic flux passing through said coil substrate in the axial direction of said output shaft.

Having described and illustrated the principles of this application by reference to preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims the benefit of Japanese Patent Application JP2010-006326, filed Jan. 14, 2010, the entire disclosure of which is incorporated by reference herein.

The invention claimed is:

1. An electric operating machine comprising:
a motor; and
a power circuit driving said motor by the electric power supplied from a battery, wherein:
said power circuit comprises a voltage conversion part converting an input voltage entered in accordance with a voltage of said battery to generate an output voltage and outputting said generated output voltage to said motor,
said power circuit is structured so that the voltage value of said output voltage of said voltage conversion part is changeable,
said voltage conversion part is configured to convert the output voltage of the battery to generate a target output voltage, the target output voltage being the input voltage to said motor and higher than the output voltage of the battery, the target output voltage having a same voltage value if the voltage of said battery is within a predetermined range including a plurality of voltage values, and said voltage conversion part is configured to lower the voltage value of the output voltage when the output voltage from the battery is out of the predetermined range and less than or equal to a predetermined value due to a usage of the battery.

2. The electric operating machine according to claim 1, wherein said power circuit further comprises:
   a voltage detection part outputting a first signal in accordance with the voltage of said battery, and
   said voltage conversion part lowers the voltage value of a new output voltage generated when said voltage detection part outputs said first signal.

3. The electric operating machine according to claim 2, wherein said voltage detection part outputs said first signal when the voltage value of the output voltage of said battery does not satisfy a given criterion.

4. The electric operating machine according to claim 3, wherein said voltage conversion part lowers the voltage value of said output voltage when said first signal is supplied.

5. The electric operating machine according to claim 2, wherein said power circuit further comprises:
   a voltage control part outputting to said voltage conversion part a second signal of a voltage value in accordance with said output voltage output from said voltage conversion part, and
   said voltage conversion part generates a new output voltage having a voltage value in accordance with said second signal output from said voltage control part, when said voltage detection part does not output said first signal.

\* \* \* \* \*